United States Patent
LeMay et al.

(10) Patent No.: US 11,250,165 B2
(45) Date of Patent: Feb. 15, 2022

(54) BINDING OF CRYPTOGRAPHIC OPERATIONS TO CONTEXT OR SPECULATIVE EXECUTION RESTRICTIONS

(71) Applicant: Intel Corporation, Santa Clara, CA (US)

(72) Inventors: Michael LeMay, Hillsboro, OR (US); David M. Durham, Beaverton, OR (US); Jason W. Brandt, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 240 days.

(21) Appl. No.: 16/723,468

(22) Filed: Dec. 20, 2019

(65) Prior Publication Data

US 2020/0134234 A1    Apr. 30, 2020

(51) Int. Cl.
*G06F 21/72* (2013.01)
*H04L 9/08* (2006.01)

(52) U.S. Cl.
CPC ............ *G06F 21/72* (2013.01); *H04L 9/0894* (2013.01)

(58) Field of Classification Search
CPC ..... G06F 21/72; G06F 21/602; H04L 9/0894; H04L 9/0822; H04L 9/0631
See application file for complete search history.

(56) References Cited

U.S. PATENT DOCUMENTS

| | | | |
|---|---|---|---|
| 8,085,934 B1 * | 12/2011 | Bhooma | G06F 9/30007 380/44 |
| 9,213,653 B2 | 12/2015 | Durham et al. | |
| 9,436,847 B2 | 9/2016 | Durham et al. | |
| 9,514,285 B2 | 12/2016 | Durham et al. | |
| 9,811,661 B1 | 11/2017 | Golovkin et al. | |
| 9,830,162 B2 | 11/2017 | LeMay | |
| 9,990,249 B2 | 6/2018 | Durham et al. | |
| 10,216,522 B2 | 2/2019 | LeMay | |
| 10,387,305 B2 | 8/2019 | Durham et al. | |

(Continued)

FOREIGN PATENT DOCUMENTS

| | | |
|---|---|---|
| EP | 2073430 A1 | 6/2009 |
| EP | 3326102 A1 | 5/2018 |

(Continued)

OTHER PUBLICATIONS

USPTO Non-Final Office Action in U.S. Appl. No. 16/723,977 dated Aug. 3, 2021 (37 pages).

(Continued)

*Primary Examiner* — J. Brant Murphy
(74) *Attorney, Agent, or Firm* — Alliance IP, LLC

(57) ABSTRACT

A processor comprising a first register to store a wrapping key, a second register to store a pointer to a handle stored in a memory coupled to the processor, the handle comprising a cryptographic key encrypted using the wrapping key, and a core to execute a decryption instruction. The core is to, responsive to the decryption instruction, identify, in the decryption instruction, a pointer to ciphertext stored in the memory, retrieve the ciphertext and the handle from the memory, decrypt the cryptographic key of the handle based on the wrapping key, and decrypt the ciphertext based on the decrypted cryptographic key.

20 Claims, 12 Drawing Sheets

(56) References Cited

U.S. PATENT DOCUMENTS

| | | | |
|---|---|---|---|
| 10,585,809 B2 | 3/2020 | Durham et al. | |
| 10,706,164 B2 | 7/2020 | LeMay et al. | |
| 2003/0091185 A1 | 5/2003 | Swindlehurst et al. | |
| 2008/0080708 A1* | 4/2008 | McAlister | H04L 9/0844 380/44 |
| 2008/0130895 A1* | 6/2008 | Jueneman | H04L 9/3252 380/277 |
| 2009/0220071 A1* | 9/2009 | Gueron | G06F 9/30007 380/28 |
| 2009/0254774 A1 | 10/2009 | Chamdani et al. | |
| 2011/0099429 A1 | 4/2011 | Varma et al. | |
| 2011/0161680 A1 | 6/2011 | Grube et al. | |
| 2011/0296202 A1 | 12/2011 | Henry et al. | |
| 2012/0284461 A1 | 11/2012 | Larin et al. | |
| 2013/0275766 A1* | 10/2013 | Plainecassagne | G06F 21/71 713/189 |
| 2015/0244518 A1 | 8/2015 | Koo et al. | |
| 2015/0378941 A1 | 12/2015 | Rozas et al. | |
| 2016/0056954 A1 | 2/2016 | Lee et al. | |
| 2016/0092702 A1* | 3/2016 | Durham | G06F 9/34 713/190 |
| 2016/0094552 A1* | 3/2016 | Durham | G06F 21/00 713/171 |
| 2016/0104009 A1 | 4/2016 | Henry et al. | |
| 2016/0154963 A1 | 6/2016 | Kumar et al. | |
| 2016/0188889 A1 | 6/2016 | Trivedi et al. | |
| 2016/0285892 A1 | 9/2016 | Kishinevsky et al. | |
| 2016/0364707 A1 | 12/2016 | Varma | |
| 2017/0063532 A1* | 3/2017 | Bhattacharyya | G06F 21/76 |
| 2017/0285976 A1* | 10/2017 | Durham | G06F 12/1408 |
| 2018/0095812 A1 | 4/2018 | Deutsch et al. | |
| 2018/0109508 A1 | 4/2018 | Wall et al. | |
| 2018/0287785 A1* | 10/2018 | Pfannenschmidt | H04L 9/0822 |
| 2018/0365069 A1 | 12/2018 | Nemiroff et al. | |
| 2019/0026236 A1 | 1/2019 | Barnes | |
| 2019/0042481 A1 | 2/2019 | Feghali et al. | |
| 2019/0042734 A1 | 2/2019 | Kounavis et al. | |
| 2019/0042766 A1 | 2/2019 | Pappachan et al. | |
| 2019/0042796 A1 | 2/2019 | Bokern et al. | |
| 2019/0042799 A1 | 2/2019 | Durham et al. | |
| 2019/0044954 A1 | 2/2019 | Kounavis et al. | |
| 2019/0050558 A1 | 2/2019 | LeMay et al. | |
| 2019/0095350 A1* | 3/2019 | Durham | G06F 21/602 |
| 2019/0102567 A1* | 4/2019 | Lemay | G06F 8/41 |
| 2019/0102577 A1* | 4/2019 | Gueron | G06F 12/1408 |
| 2019/0227951 A1 | 7/2019 | Durham et al. | |
| 2019/0347445 A1* | 11/2019 | Chen | H04L 9/0822 |
| 2019/0354726 A1 | 11/2019 | Critelli et al. | |
| 2020/0004953 A1 | 1/2020 | LeMay et al. | |
| 2020/0007332 A1 | 1/2020 | Girkar et al. | |
| 2020/0076585 A1* | 3/2020 | Sheppard | H04L 9/083 |
| 2020/0117810 A1 | 4/2020 | Kounavis et al. | |
| 2020/0125501 A1 | 4/2020 | Durham et al. | |
| 2020/0125502 A1 | 4/2020 | Durham et al. | |
| 2020/0125742 A1 | 4/2020 | Kounavis et al. | |
| 2020/0125769 A1 | 4/2020 | Kounavis et al. | |
| 2020/0125770 A1 | 4/2020 | LeMay et al. | |
| 2020/0145187 A1 | 5/2020 | Kounavis et al. | |
| 2020/0145199 A1 | 5/2020 | Kounavis et al. | |
| 2020/0159676 A1 | 5/2020 | Durham et al. | |
| 2020/0169383 A1 | 5/2020 | Durham et al. | |
| 2020/0201789 A1 | 6/2020 | Durham et al. | |
| 2020/0257827 A1 | 8/2020 | Kounavis et al. | |
| 2020/0382289 A1* | 12/2020 | Xue | H04L 9/0822 |
| 2021/0058379 A1* | 2/2021 | Bursell | H04L 9/14 |

FOREIGN PATENT DOCUMENTS

| | | |
|---|---|---|
| JP | 2009139899 A | 6/2009 |
| WO | 2017014885 A1 | 1/2017 |

OTHER PUBLICATIONS

Bernstein, Daniel J., "Gimli," Sep. 27, 2019, retrieved from https://csrc.nist.gov/CSRC/media/Projects/lightweight-cryptography/documents/round-2/spec-doc-md2/gimli-spec-round2.pdf, (48 pages).

BiiN, "CPU Architecture Reference Manual", accessed at http://bitsavers.informatik.uni-stuttgart.de/pdf/biin/BiiN_CPU_Architecture_Reference_Man_Jul88.pdf, Jul. 1988, 401 pages.

Boivie, Rick, IBM Research Report, SecureBlue++: CPU Support for Secure Execution, May 23, 2012, available online at https://domino.research.IBM.com/library/cyberdig.nsf/papers/E605BDC5439097F085257A13004D25CA/$File/rc25287.pdf, (10 pages).

Dworkin, Morris, "Recommendation for Block Cipher Modes of Operation: The XTS-AES Mode for Confidentiality on Storage Devices," NIST Special Publication 800-38E, Jan. 2010, available online at https://nvlpubs.nist.gov/nistpubs/Legacy/SP/nistspecialpublication800-38e.pdf, (12 pages).

Gallagher, Mark et al., "Morpheus: A Vulnerability-Tolerant Secure Architecture Based on Ensembles of Moving Target Defenses with Churn," ASPLOS '19, Apr. 13-17, 2019, pp. 469-484, available online at https://web.eecs.umich.edu/~barisk/public/morpheus.pdf, (16 pages).

Gallagher, Mark, Slide Deck entitled "Morpheus: A Vulnerability-Tolerant Secure Architecture Based on Ensembles of Moving Target Defenses with Churn," ASPLOS '19, Apr. 13-17, 2019, retrieved from https://twd2.me/wp-content/uploads/2019/05/Morpheus-1.pdf, (45 pages).

Intel 64 and IA-32 Architectures Developer's Manual, vol. 3A: System Programming Guide, Part 1, retrieved from https://www.intel.com/content/www/us/en/architecture-and-technology/64-ia-32-architectures-software-developer-vol-3a-part-1-manual.html, (468 pages).

Intel® 64 and IA-32 Architectures Software Developer's Manual, vol. 2B: Instruction Set Reference, M-U, Sep. 2016, retrieved from https://www.intel.com/content/dam/www/public/us/en/documents/manuals/64-ia-32-architectures-software-developer-vol-2b-manual.pdf, (706 pages).

Intel® 64 and IA-32 Architectures Software Developer's Manual, vol. 3D: System Programming Guide, Part 4, Sep. 2016, 224 pages, retrieved from https://www.intel.com/content/dam/www/public/us/en/documents/manuals/64-ia-32-architectures-software-developer-vol-3d-part-4-manual.pdf, (224 pages).

Liljestrand, Hans et al. "PACStack: an Authenticated Call Stack," Sep. 3, 2019, retrieved from https://arxiv.org/pdf/1905.10242.pdf, (20 pages).

Qualcomm Technologies, Inc., "Pointer Authentication on ARMv8.3, Design and Analysis of the New Software Security Instructions," Jan. 2017, retrieved from https://www.qualcomm.com/media/documents/files/whitepaper-pointer-authentication-on-armv8-3.pdf, (12 pages).

Savry, Olivier, et al., "Intrinsec, an Intrinsically Secure Processor", RISC V Workshop, Dec. 6, 2019, accessed at: http://riscv.org/wp-content/uploads/2019/06/16.15-CEA-RISC-V-Workshop-Zurich.pdf, (15 pages.).

Serebryany, Kostya, "ARM Memory Tagging Extension and How it Improves C/C++ Memory Safety," Summer 2019, (5 pages).

USPTO Non-Final Office Action in U.S. Appl. No. 16/723,927 dated Jun. 8, 2021 (32 pages).

USPTO Non-Final Office Action in U.S. Appl. No. 16/724,105 dated Jul. 13, 2021 (10 page).

Watson, Robert N.M., et al., "CHERI: A Hybrid Capability-System Architecture for Scalable Software Compartmentalization", 2015 IEEE Symposium on Security and Privacy, May 2015, accessed at https://discovery.ucl.ac.uk/id/eprint/1470067/1/oakland15cheri.pdf, 18 pages.

"Armv8.5-A Memory Tagging Extension White Paper", Oct. 9, 2019, accessed at https://developer.arm.eom/-/media/Arm%20Developer%20Community/PDF/Arm_Memory_Tagging_Extension_Whitepaper.pdf, 9 pages.

Avanzi, Roberto, "The QARMA Block Ciper Family, Almost MDS Matrices Over Rings With Zero Divisors, Nearly Symmetric Even-Mansour Constructions With Non-Involutory Central Rounds, and

(56) References Cited

OTHER PUBLICATIONS

Search Heuristics for Low-Latency S-Boxes," Qualcomm Product Security, Munich Germany, IACR Transactions on Symmetric Cryptology, 2017 (1) (40 pages).

Beaulieu, Ray et al., "Simon and Spec: Block Ciphers for the Internet of Things," National Security Agency, Jul. 2015 (15 pages).

Borghoff, Julia et al., "PRINCE—A Low-Latancy Block Ciper for Pervasive Computing Applications," Advances in Cryptology—ASIACRYPT 2012—18th International Conference on the Theory and Application of Cryptology and Information Security, Beijing, China, Dec. 2-6, 2012. Proceedings (pp. 208-225).

Chen, Tony, et al., "Pointer Tagging for Memory Safety", accessed at https://www.microsoft.com/en-us/research/uploads/prod/2019/07/Pointer-Tagging-for-Memory-Safety.pdf, Jul. 2019, 23 pages.

EPO; Extended European Search Report issued in EP Patent Application No. 20163534.9, dated Sep. 24, 2020 8 pages.

EPO; Extended European Search Report issued in EP Patent Application No. 20163546.3, dated Sep. 28, 2020 8 pages.

EPO; Extended European Search Report issued in EP Patent Application No. 20163670.1, dated Sep. 29, 2020 8 pages.

EPO; Extended European Search Report issued in EP Patent Application No. 20163907.7, dated Oct. 6, 2020; 9 pages.

EPO; Extended European Search Report issued in EP Patent Application No. 20164326.9, dated Oct. 2, 2020; 9 pages.

EPO; Extended European Search Report issued in EP Patent Application No. 20164636.1, dated Oct. 6, 2020; 8 pages.

EPO; Extended European Search Report issued in EP Patent Application No. 20168972.6, dated Jul. 3, 2020; 9 pages.

EPO; Extended European Search Report issued in EP Patent Application No. 20181907.5, dated Nov. 2, 2020; 9 pages.

EPO; Extended European Search Report issued in EP Patent Application No. 20193625.9, dated Feb. 22, 2021; 7 pages.

EPO; Extended European Search Report issued in European Patent Application No. EP 20163095.1, dated Aug. 10, 2020; 9 pages.

EPO; Extended European Search Report issued in Patent Application No. EP 20163518.2, dated Aug. 19, 2020; 10 pages.

EPO; Extended European Search Report issued in Patent Application No. EP 20163661.0, dated Aug. 17, 2020; 9 pages.

Liljestrand, Hans, et al., "PAC it up: Towards Pointer Integrity using ARM Pointer Authentication", accessed at https://arxiv.org/pdf/1811.09189.pdf, last updated May 24, 2019, 21 pages.

Neagu, Madalin, et al.; "Increasing Memory Security Through Data Scrambling and Information Entropy Models," 2014 IEEE 15th International Symposium on Computational Intelligence and Informatics; Nov. 2014; 5 pages.

The Electronics Resurgence Initiative, "SSITH: TA1 (Hardware) Performers", accessed at: https://eri-summit.darpa.mil/docs/ERIPoster_Applications_SSITH_DARPA.pdf, Mar. 20, 2020, 1 page.

Watson, Robert N.M., et al., "An Introduction to CHERI", Technical Report UCAM-CL-TR-941, University of Cambridge Computer Labratory, Cambridge, United Kingdom, Sep. 2019, 43 pages.

Carr, Scott A et al., "DataShield: Configurable Data Confidentiality and Integrity," Purdue University, ASIA CCS, '17, Apr. 2-6, 2017, Abu Dhabi, United Arab Emirates (12 pages).

Xu, Leslie et al., "White Paper, Securing the Enterprise with Intel AES-NI, Intel Advanced Encryption Standard New Instructions (AES-NI)," Intel Corporation, Version, 2.0, Sep. 2010 (13 pages).

USPTO Non-Final Office Action in U.S. Appl. No. 16/740,359 dated Sep. 27, 2021 (8 pages).

\* cited by examiner

BINDING OF CRYPTOGRAPHIC OPERATIONS TO CONTEXT OR SPECULATIVE EXECUTION RESTRICTIONS

TECHNICAL FIELD

This disclosure relates in general to the field of computing systems and, more particularly, to binding cryptographic operations to context or speculative execution restrictions.

BACKGROUND

Protecting memory in computer systems from software bugs and security vulnerabilities is a significant concern. A malicious actor may attempt to access data which it is not authorized to access. Encrypting data before storage may mitigate the potential of damage from malicious actors. However, even if data is ultimately stored in an encrypted state, it may still be vulnerable in various situations, e.g., if the data is spilled to the stack in an unencrypted state or the malicious actor obtains the location of an encryption key (even if the key itself is encrypted).

BRIEF DESCRIPTION OF THE DRAWINGS

Like reference numbers and designations in the various drawings indicate like elements.

DESCRIPTION OF EXAMPLE EMBODIMENTS

Figure 1:
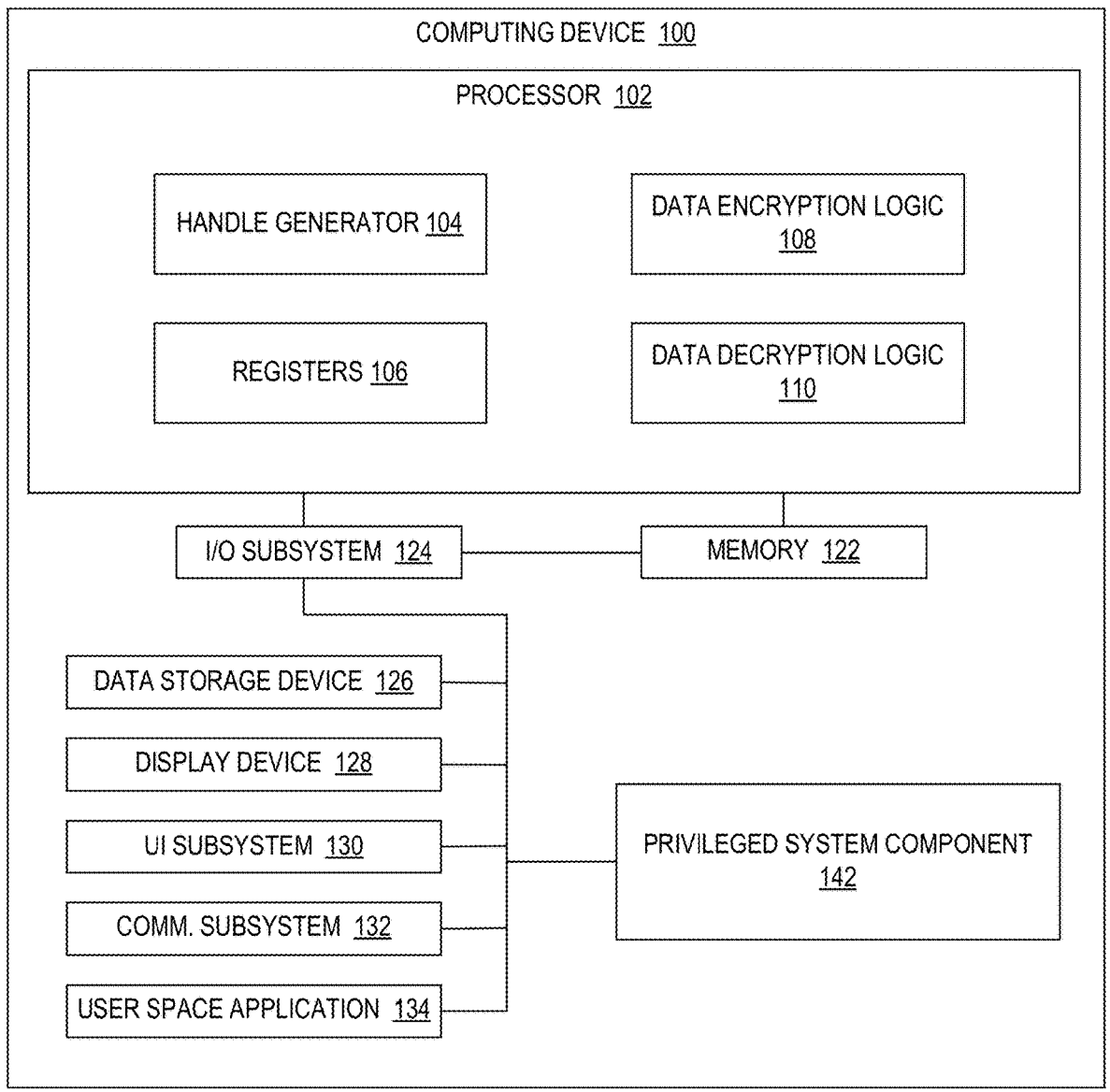
FIG. 1 illustrates a computing device in accordance with certain embodiments.

Various embodiments of the present disclosure may protect sensitive data within an application by binding cryptographic operations to context or speculative execution restrictions. In various embodiments, an encryption instruction called by an application may utilize context associated with the data to be encrypted or the memory location at which the encrypted data is to be stored as a tweak to the encryption. The tweak and a cryptographic key may be provided as input to a cryptographic operation performed by a processor that encrypts the data based on the tweak and the cryptographic key. When the encrypted data is decrypted, the application may provide the context in association with a decryption instruction such that the context information may be used as a tweak along with the cryptographic key to correctly decrypt the data. If the context supplied for the decryption operation does not match the context used in the encryption operation, the data output will not match the cleartext that was previously encrypted (rather the output will be garbled data). Any suitable context information (e.g., tags, types, size of object, etc.) may be used as a tweak to the cryptographic operations. In a particular embodiment, the context information includes an identifier of a cryptographic context. A cryptographic context is a particular memory space which may be authorized for a single tenant of a processor 102, a set of two or more tenants, or all of the tenants. When data associated with a particular cryptographic context is encrypted, the encryption may be based on a cryptographic key and a tweak comprising an identifier of the cryptographic context. That same cryptographic context identifier must be supplied by the calling application when a decryption instruction is executed in order to successfully decrypt the data. Such embodiments may preserve confidentiality and potentially integrity between different cryptographic contexts.

In various embodiments, the encryption key or the IDs of the cryptographic contexts may be stored using in-memory handles and cached in software-invisible registers rather than being stored in software-visible registers. In some situations, an untrusted application may use a handle containing an encryption key associated with a cryptographic context to switch to the cryptographic context or to decrypt sensitive data within the current cryptographic context.

Various embodiments may additionally or alternatively bind cryptographic operations to speculative execution restrictions. Speculative execution includes the execution of instructions that may or may not be included in the actual instruction stream. Execution is performed speculatively in order to prevent delays that would be incurred by waiting to perform the execution until it is known that the execution is needed. Speculative execution may comprise any suitable actions, such as branch prediction, prefetch operations, or other suitable operations. Various proposals may restrict certain kinds of speculative execution within entire processes to prevent information from any portion of the process from leaking. However, speculative execution typically improves performance and thus limiting speculative execution restrictions to the most sensitive code (e.g. crypto libraries) may be desirable. To enable this, access to sensitive plaintext may be blocked unless speculative execution restrictions are active. Otherwise, even if an application only loads plaintext secrets with speculative execution restrictions by storing the secrets in memory in encrypted form and only issuing decryption instructions when speculative execution restrictions are active, an adversary might still try to use Branch Target Injection (BTI) to induce a control flow that loads and decrypts the secrets with speculative execution restrictions disabled so that the secrets may leak.

In various embodiments, particular decryption instructions executed by the processor 102 only decrypt data if speculative execution restrictions are active. Sensitive data can be selectively encrypted such that it can only be decrypted when speculative execution restrictions are active to prevent an adversary from decrypting the data when speculative execution is not restricted and thus potentially leaking the data. In some embodiments, data may be automatically encrypted by the processor 102 (e.g., the processor may initiate the encryption without doing so directly responsive to a software instruction from an application requesting such encryption) when the data is spilled to the stack when speculative execution restrictions are active (since derivatives of the decrypted sensitive data may need to be spilled to the stack due to register space limitations) in order to protect data from being leaked while on the stack.

Referring in detail to FIG. 1, the computing device 100 may be embodied as any type of electronic device for performing the functions described herein. For example, the computing device 100 may be embodied as, without limitation, a smart phone, a tablet computer, a wearable computing device, a laptop computer, a notebook computer, a mobile computing device, a cellular telephone, a handset, a messaging device, a vehicle telematics device, a server computer, a workstation, a distributed computing system, a multiprocessor system, a consumer electronic device, and/or any other computing device configured to perform the functions described herein.

As shown in FIG. 1, the example computing device 100 includes at least one processor 102. Processor 102 includes handle generator 104 for generating handles (described in more detail below), registers 106 which may include, e.g., general purpose registers and special purpose registers (e.g., for storing instruction operands, context information, a wrapping key, or other suitable data referred to herein), data encryption logic 108 to encrypt data based on various cryptographic keys and/or tweaks, and data decryption logic 110 to decrypt data based on the cryptographic keys and/or tweaks (the encryption and decryption operations will be described in more detail below).

The computing device 100 also includes memory 122, an input/output subsystem 124, a data storage device 126, a display device 128, a user interface (UI) subsystem 130, a communication subsystem 132, at least one user space application 134, and privileged system component 142. The computing device 100 may include other or additional components, such as those commonly found in mobile and/or stationary computers (e.g., various sensors and input/output devices), in other embodiments. Additionally, in some embodiments, one or more of the example components may be incorporated in, or otherwise form a portion of, another component. Each of the components of the computing device 100 may be embodied as software, firmware, hardware, or a combination of software and hardware.

The processor 102 may be embodied as any type of processor capable of performing the functions described herein. For example, the processor 102 may be embodied as a single or multi-core central processing unit (CPU), a multiple-CPU processor, a processing/controlling circuit, or multiple diverse processing units or circuits (e.g., a CPU and a Graphic Processing Unit (GPU), etc.).

The memory 122 of the computing device 100 may be embodied as any type of volatile or non-volatile memory or data storage capable of performing the functions described herein. Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in memory is synchronous dynamic random access memory (SDRAM). In particular embodiments, DRAM of memory 122 complies with a standard promulgated by the Joint Electron Device Engineering Council (JEDEC), such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org). Non-volatile memory is a storage medium that does not require power to maintain the state of data stored by the medium. Nonlimiting examples of non-volatile memory may include any or a combination of: solid state memory (such as planar or 3D NAND flash memory or NOR flash memory), 3D crosspoint memory, memory devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMS), and magnetic storage memory.

In some embodiments, memory 122 comprises one or more memory modules, such as dual in-line memory modules (DIMMs). In some embodiments, the memory 122 may be located on one or more integrated circuit chips that are distinct from an integrated circuit chip comprising processor 102 or may be located on the same integrated circuit chip as the processor 102. Memory 122 may comprise any suitable type of memory and is not limited to a particular speed or technology of memory in various embodiments.

In operation, the memory 122 may store various data and software used during operation of the computing device 100, as well as operating systems, applications, programs, libraries, and drivers. Memory 122 may store data and/or sequences of instructions that are executed by the processor 102.

The memory 122 is communicatively coupled to the processor 102, e.g., via the I/O subsystem 124. The I/O subsystem 124 may be embodied as circuitry and/or components to facilitate input/output operations with the processor 102, the memory 122, and other components of the computing device 100. For example, the I/O subsystem 124 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with one or more of the processor 102, the memory 122, and/or other components of the computing device 100, on a single integrated circuit chip.

The data storage device 126 may be embodied as any type of physical device or devices configured for short-term or long-term storage of data such as, for example, memory devices and circuits, memory cards, hard disk drives, solid-state drives, flash memory or other read-only memory, memory devices that are combinations of read-only memory and random access memory, or other data storage devices. In various embodiments, memory 122 may cache data that is stored on data storage device 126.

The display device 128 may be embodied as any type of display capable of displaying digital information such as a liquid crystal display (LCD), a light emitting diode (LED), a plasma display, a cathode ray tube (CRT), or other type of display device. In some embodiments, the display device 128 may be coupled to a touch screen or other human computer interface device to allow user interaction with the computing device 100. The display device 128 may be part of the user interface (UI) subsystem 130. The user interface subsystem 130 may include a number of additional devices to facilitate user interaction with the computing device 100, including physical or virtual control buttons or keys, a microphone, a speaker, a unidirectional or bidirectional still and/or video camera, and/or others. The user interface subsystem 130 may also include devices, such as motion sensors, proximity sensors, and eye tracking devices, which may be configured to detect, capture, and process various other forms of human interactions involving the computing device 100.

The computing device 100 further includes a communication subsystem 132, which may be embodied as any communication circuit, device, or collection thereof, capable of enabling communications between the computing device 100 and other electronic devices. The communication subsystem 132 may be configured to use any one or more communication technology (e.g., wireless or wired communications) and associated protocols (e.g., Ethernet, Bluetooth™, Wi-Fi™, WiMAX, 3G/LTE, etc.) to effect such communication. In some embodiments, the communication subsystem 132 may be embodied as a network adapter, such as a wireless network adapter.

The example computing device 100 also includes a number of computer program components, such as one or more user space applications 134 or other applications. The user space application 134 may be embodied as any computer application (e.g., software, firmware, hardware, or a combination thereof) that interacts directly or indirectly with an end user via, for example, the display device 128 or the UI subsystem 130. Some examples of user space applications 134 include word processing programs, document viewers/readers, web browsers, electronic mail programs, messaging services, computer games, camera and video applications, etc. Among other things, the privileged system component 142 facilitates the communication between the user space applications 134 and the hardware components of the computing device 100. Portions of the privileged system component 142 may be embodied as any operating system capable of performing the functions described herein, such as a version of WINDOWS by Microsoft Corporation, ANDROID by Google, Inc., and/or others. Alternatively or in addition, a portion of the privileged system component 142 may be embodied as any type of virtual machine monitor capable of performing the functions described herein (e.g., a type I or type II hypervisor).

In various embodiments, processor 102 may execute instructions on behalf of the applications. Some of these instructions may include encryption and decryption instructions that perform encryption and decryption operations on data used by the applications. The encryption and decryption instructions described herein may be used to provide any suitable functionality, such as full-disk encryption (FDE), network encryption (e.g., to protect data in flight with protocols such as Secure Sockets Layer (SSL), Transport Layer Security (TLS), Internet Protocol Security (IPsec), Hypertext Transfer Protocol Secure (HTTPS), File Transfer Protocol (FTP), and Secure Shell (SSH)), and application-level encryption, among others.

Figure 2:
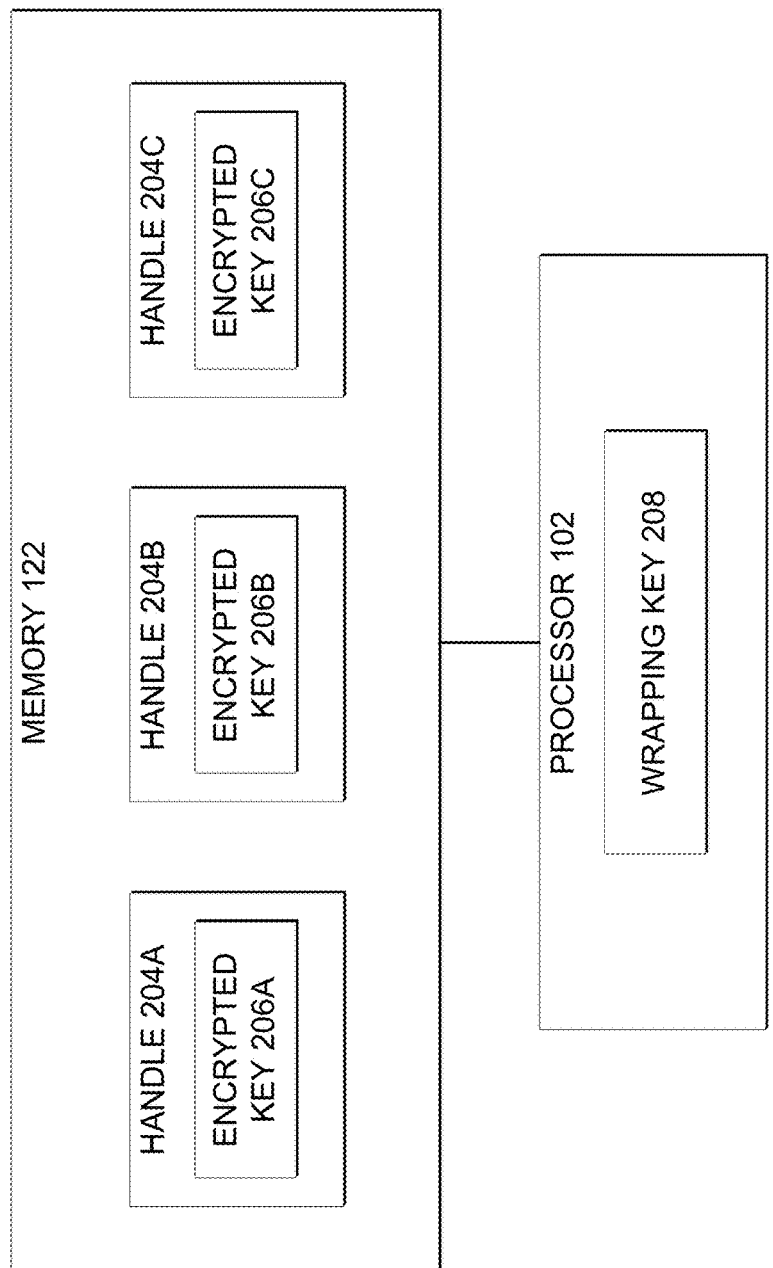
FIG. 2 illustrates a system for protecting cryptographic keys to be used in cryptographic instructions in accordance with certain embodiments.

FIG. 2 illustrates a system 200 for protecting cryptographic keys to be used in cryptographic instructions in accordance with certain embodiments. Processor 102 may implement a handle generation instruction to generate a handle 204 (e.g., 204A, 204B, 204C) comprising an encrypted cryptographic key 206 (e.g., 206A, 206B, or 206C) to be used in decryption and encryption instructions executed by the processor 102. In various embodiments, the plaintext key used to generate an encrypted key 206 is provided by the calling application (e.g., placed into a register or a location in memory 122) or other suitable entity and the location of the handle 204 (or the key itself) may be a parameter of the handle generation instruction (or may be an implicit input to the instruction such that the processor 102 is configured to store the handle to the same register or memory location each time the handle generation instruction is called). In some embodiments, the handle 204 may have a length of 384 bits, while in other embodiments, the handle 204 have any other suitable length (e.g., 64 bits, 128 bits, 256 bits, etc.). The plaintext key and the encrypted key 206 may also have any suitable length.

During execution of the handle generation instruction, the plaintext key may be encrypted based on a wrapping key 208 that is stored within a register or other memory that is internal to the processor 102 such that software applications utilizing the handle generation instruction do not have direct access to the wrapping key 208 (although in some situations, a privileged software application may be able to access the wrapping key). A generated handle 204 may be stored by the processor 102 in a register (not shown) accessible to the calling software application or may be written to a memory location. If the handle is output into a register by the processor 102, the calling software application may then store the generated handle in memory 122 (which in some embodiments may be a system memory accessible by any number of different applications), which may allow for scalable protection of numerous handles 204 generated for various software applications.

In some embodiments, a first type of handle generation instruction may be used to generate a handle that is restricted to usage for decryption operations when speculative execution restrictions are enabled and a second type of handle generation instruction (e.g., having a different opcode or other parameter that differentiates it from the first type) may be used to generate a handle that may be used for decryption operations regardless of whether speculative execution restrictions are enabled or not. In various embodiments, the handle that is generated may include one or more bits that indicate whether speculative execution restrictions must be enabled before the encrypted key of the handle may be used to decrypt data.

Figure 3:
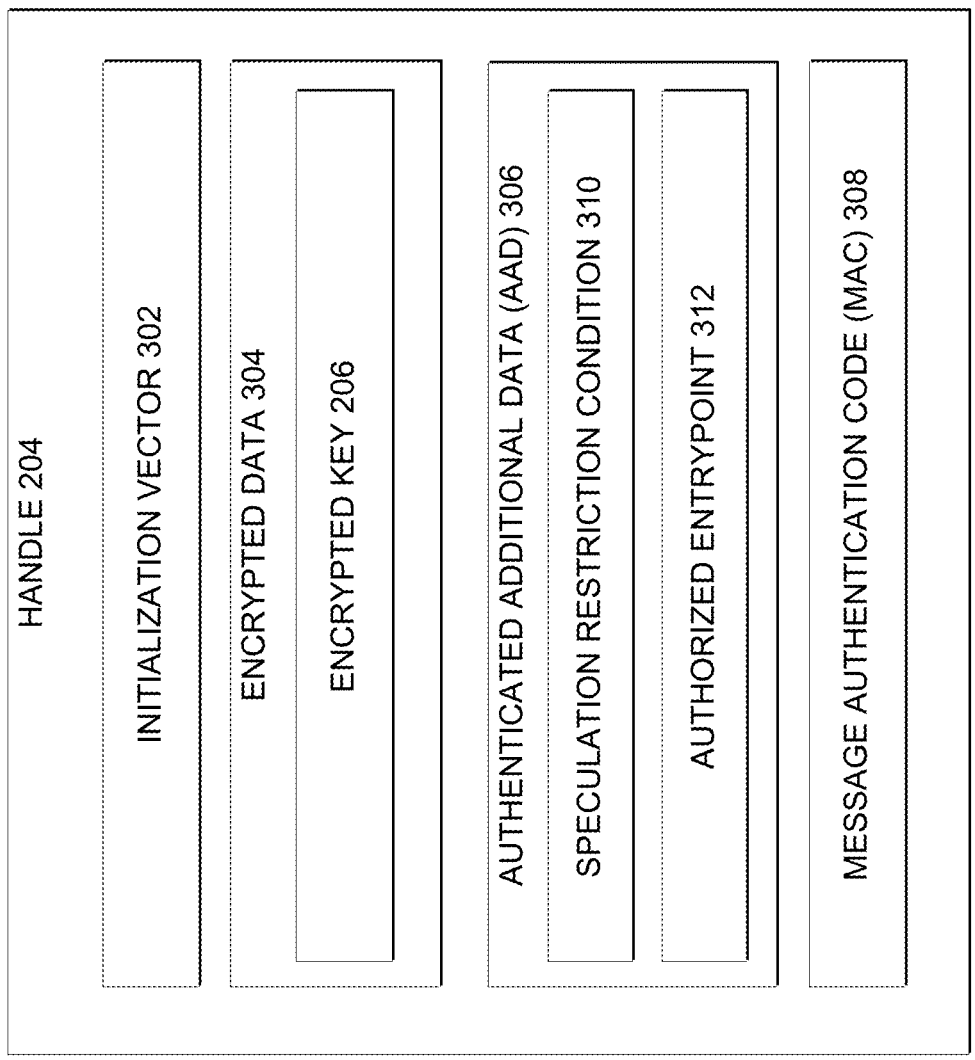
FIG. 3 illustrates a handle in accordance with certain embodiments.

FIG. 3 illustrates a handle 204 in accordance with certain embodiments. Handle 204 includes an initialization vector 302, encrypted data 304 (including encrypted key 206), unencrypted authenticated additional data (AAD) 306, and message authentication code (MAC) 308. In various embodiments, one or more of the components of handle 204 may be omitted or other components may be included depending on the implementation of the handle instruction being used to generate the handle. For example, some cryptographic modes (e.g., Advanced Encryption Standard (AES)) do not require an initialization value or may synthetically derive an initialization value from other portions of the handle 204. As other examples, AAD 306 or the MAC 308 may be omitted in some implementations.

An initialization vector 302 may introduce variation in the cryptographic operation that wraps the key to produce encrypted key 206 (e.g., the initialization vector may be used as a tweak in the encryption of the key). In an embodiment, the initialization vector is a random number. Encrypted data 304 includes the encrypted key 206 and may, in some instances, include other encrypted data.

AAD 306 may include unencrypted data. The AAD may comprise configuration parameters, such as one or more of a speculative execution restriction condition 310 or authorized entrypoint 312. Speculative execution restriction condition 310 may include a value indicating whether the encrypted key may be used in a decryption operation (e.g., in response to an attempted execution of a decryption instruction referencing the handle) when speculative execution restrictions are not set. In an embodiment, when the first type of handle generation instruction (referenced above) is called, the speculative execution restriction condition 310 is set (indicating that decryption may not be performed unless speculative execution restrictions are enabled), whereas if the second type of handle generation instruction (referenced above) is called, the speculative execution restriction condition 310 is not set (indicating that decryption may be performed even if speculative execution is unrestricted). In another embodiment, the processor 102 may have a first mode that restricts all decryption instructions referencing a handle 204 with an encrypted key 206 unless speculative execution restrictions are activated and a second mode that does not restrict such decryption instructions whether or not speculative execution restrictions are active. A single handle generation instruction may be used and when the handle generation instruction is executed, the mode of the processor 102 is checked. If the processor 102 is in the first mode, the speculative execution restriction condition 310 may be set, whereas if the processor 102 is in the second mode, the speculative execution restriction condition 310 is not set. Alternatively, the condition 310 may be omitted from the handle 204 and the processor may be configured to allow or not allow execution of a decryption instruction referencing a handle 204 with an encrypted key 206 based solely on a mode of the processor (e.g., one mode may allow decryption only when speculative execution restrictions are enabled, while another mode may allow decryption even when speculative execution restrictions are not enabled).

Authorized entrypoint 312 may comprise a pointer to an entrypoint to a region authorized to use the key 206 to decrypt data. This may ensure that the proper instructions (rather than malicious or buggy code) are being used with the key 206 to decrypt data.

In various embodiments, encrypted data 304 and AAD 306 may be authenticated via the MAC 308, such that a recipient of the handle 204 (e.g., processor 102) may perform a transformation on the contents of the encrypted data 304 and AAD 306 and may determine whether the handle 204 has been tampered with based on a comparison of the result of the transformation with the MAC 308.

Figure 4:
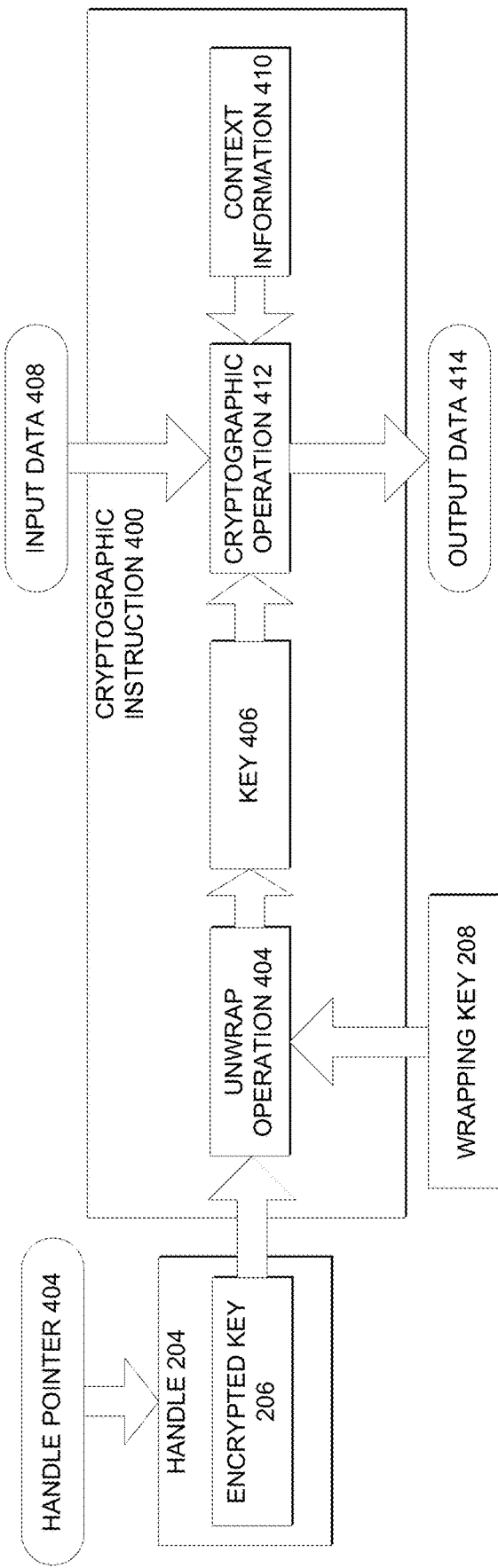
FIG. 4 illustrates a flow for a cryptographic instruction utilizing a wrapping key in accordance with certain embodiments.

FIG. 4 illustrates a flow for a cryptographic instruction utilizing a handle 204 including an encrypted key 206 in accordance with certain embodiments. The cryptographic instruction 400 may be an encryption instruction or a decryption instruction and may be distinguished from a standard cryptographic instruction that references an unencrypted key and data for use in an encryption operation (which in various embodiments may also be executed by processor 102). The cryptographic instruction may include one or more of a first parameter referencing a handle 204, a second parameter referencing input data 408 (e.g., plaintext data in the case of an encryption instruction or ciphertext data in the case of a decryption instruction), a third parameter referencing output data 414, and a fourth parameter referencing context information 410. Some example variations of the format of the cryptographic instruction are described below, and other variations are contemplated by the present disclosure.

During execution of the cryptographic instruction, the processor 102 may authenticate a portion (e.g., the encrypted key 206 and/or AAD 306) of the handle 204 (e.g., using a MAC included within the handle). Upon successful authentication, the processor 102 uses wrapping key 208 to decrypt the encrypted key 206 within the handle to generate plaintext key 406. In some embodiments, key 406 or information derived therefrom (e.g., a key schedule) may be cached within the processor 102 and, in response to instruction 400, the processor 102 may determine whether a reference (e.g., location) within the instruction 400 to the handle matches a reference to the handle specified in a previously executed cryptographic instruction and may then use the cached key 406 and/or information derived therefrom if a match is present rather than repeat the unwrap operation (and key schedule generation).

In the case of an encryption operation, the processor 102 then encrypts the input data 408 using the key 406 (and/or information derived therefrom) to generate encrypted output data 414. In the case of a decryption operation, the processor 102 decrypts the input data 408 using the key 406 (and/or information derived therefrom) to generate plaintext output data 414. In various embodiments, the context information 410 may be used (e.g., as a tweak) along with the key 406 to perform the encryption and decryption operations. As used herein, the term "key" may refer to an encryption secret that is passed as an input to a cryptographic mode and may support at least one of the functions of confidentiality and data integrity. For example, a key may refer to a secret bit string that is expanded into a round key schedule string, as performed by typical block ciphers. As used herein, a "tweak" may refer to a value comprising one or more bits used to customize the operation of a block cipher or a cryptographic hash function. For example, a tweak may refer to, among other things, an extra input to a block cipher (e.g., an input other than the usual plaintext or ciphertext input and the cryptographic key). When the same plaintext is encrypted using the same cryptographic key, different tweak values will result in different encrypted data outputs. Similarly, when the same ciphertext is decrypted using the same cryptographic key, different tweak values will result in different plaintext outputs.

Any suitable cryptographic mode may be used to perform the encryption and decryption operations. For example, the processor 102 may utilize Advanced Encryption Standard Electronic Codebook (AES-ECB), AES xor-encrypt-xor (XEX) based tweaked-codebook mode with ciphertext stealing (AES-XTS), AES counter (AES-CTR), or other suitable cryptographic modes of operation. In some embodiments, AES-ECB may be used when context information 410 is not used as a tweak for the cryptographic operation, while AES-XTS or AES-CTR may be utilized when context information 410 is used as a tweak. Upon completion of the cryptographic operation, the output data 414 is stored by the processor 102 (e.g., in a register accessible to the calling application or in memory 122).

Some cryptographic modes such as AES-CTR may support encrypting and decrypting data that is not aligned to the block size of the cipher. To support accessing such data at arbitrary offsets, even if the offsets differ for overlapping data regions at different points in the program, the cryptographic operation may adjust the generation of the keystream that is combined with the data to account for the misalignment of the data with the block size. For example, if a 16-byte block size is used and a cryptographic operation is performed on an 8-byte region with a starting address of 0x100B, then the 16-byte-aligned address 0x1000 may be supplied as the address portion of the tweak (e.g., this address may be included within context information 410) for processing the data in the range 0x100B-0x100F. The cryptographic operation may discard the first 11 bytes of the keystream to account for the misalignment of the data with the block size. The cryptographic operation may then generate another block of keystream supplying the address 0x1010 as the address portion of the tweak and use the first three bytes of the keystream to process the remaining three bytes of data.

In various embodiments, parameters of the cryptographic instruction 400 may be explicit (e.g., the parameters may be included within the instruction itself) or implicit (e.g., the processor 102 may be configured to access a particular register or other memory location to obtain the parameter when the cryptographic instruction 400 is executed). In some embodiments, the first parameter referencing a handle 204 may be a memory location at which the handle 204 is stored, an identification of a register that stores the handle 204, or an identification of a register that stores the memory location (e.g., in memory 122) at which the handle 204 is stored. In various embodiments, the second parameter referencing input data 408 may be a memory location at which the input data 408 is stored, an identification of a register that stores the input data 408, or an identification of a register that stores the memory location (e.g., in memory 122) at which the input data 408 is stored. In some embodiments, a third parameter referencing output data 414 may be a memory location at which the output data 414 is to be stored or an identification of a register to store the output data 408. In various embodiments, the fourth parameter referencing context information 410 may be an identification of a register or other memory location that stores the context information or an immediate operand within the instruction 400 that explicitly specifies the context information. In another embodiment, the fourth parameter referencing context information 410 may be an implicit parameter (e.g., the processor 102 may be configured to access context information 410 stored in a particular register, such as a general purpose register, each time the instruction is executed). In yet another embodiment, context information 410 may be derived by the processor 102 (e.g., from the memory address specified by the instruction in the second or third parameter). These are example parameters only, and other embodiments may include any suitable representation of or reference to the values to be used in the cryptographic instruction 400.

In one embodiment, the first parameter referencing the handle 204 is a location in memory (e.g., 122) at which the handle is stored, the second parameter referencing input data 408 is an identification of a register that stores the input data 408 (e.g., a register matching the size of the block cipher to be used, which could be, e.g., an XMM register for a 128-bit block cipher or a general purpose register for a 64-bit block cipher), the third parameter referencing output data 414 is the same register that stores the input data 408 (thus the instruction specifies a single parameter for both the second and the third parameter and the input data is overwritten by the output data), and the fourth parameter is omitted. In other embodiments (e.g., where context information is to be used as a tweak), the fourth parameter may be included within the instruction as an immediate operand or an identification of a register, may be derived from other information in the instruction, may be accessed from a register that is implicitly specified by the instruction, or may otherwise be obtained.

In another embodiment, the first parameter referencing the handle 204 is an implicit operand. For example, the memory location of the handle may be specified by the calling application by loading the location into a register prior to calling the instruction 400. The instruction 400 does not explicitly include a reference to the handle, rather the processor 102 is configured to retrieve the handle from the memory location stored in the register (and the processor 102 is configured to access this same register each time instruction 400 is called). Making the first parameter implicit may enable the instruction to refer to a memory location (e.g., in memory 122) of the input or output data (rather than have to load the input data into a register before calling the instruction 400, since in some instruction set architectures an instruction may be limited to specification of a single memory address). Thus, such embodiments may allow explicit reference by the instruction to a memory location for the input data or the output data, thus significantly enhancing the efficiency of cryptographic operations (e.g., when a large amount of scattered data is being encrypted or decrypted). In various embodiments, the register that stores the memory location of the handle is a usermode control register (UCR) so that unprivileged applications (e.g., which may be running at ring 3 or equivalent) can update the location of the handle via an instruction that allows the application to write a pointer to the handle to the register or access via an instruction that allows the application to read the pointer to the handle value from the register.

The second parameter referencing the input data 408 may include an identification of a register storing the input data or a location in memory of the input data. In some embodiments, if the instruction 400 is an encryption instruction, the second parameter includes an identification of a register storing the plaintext and if the instruction 400 is a decryption instruction, the second parameter includes a memory location storing the ciphertext input. The third parameter referencing the output data 408 may include an identification of a register to store the output data or a location in memory to store the output data. In some embodiments, if the instruction 400 is a decryption instruction, the third parameter includes an identification of a register to store the decrypted plaintext and if the instruction 400 is an encryption instruction, the third parameter includes a memory location to store the ciphertext output.

The fourth parameter may be omitted if context information 410 is not used as a tweak, or the fourth parameter may be included within the instruction as an immediate operand or an identification of a register that stores the context information 410 (or otherwise explicitly or implicitly identified) when the context information 410 is used in the cryptographic operation 412. In other embodiments, the context information 410 may be derived from other information in the instruction, may be accessed from a register that is implicitly specified by the instruction, or may otherwise be obtained.

In various embodiments, variants of instruction 400 may be defined (e.g., where each variant specifies a different opcode) for different cryptographic modes, different length cryptographic keys (e.g., 128 or 256 bit keys), and/or narrow/wide operations (e.g., an instruction may operate on a single block while another instruction may operate on multiple blocks (e.g., 8 blocks)). In other embodiments, these various characteristics of the instruction may be implemented using parameters of the instruction rather than variants (e.g., with different parameter values rather than different opcodes).

Any suitable information may be included within the context information 410 that is used as a tweak for the cryptographic instruction 400. In various embodiments, the context information 410 may be included within or derived from a pointer to the input data 408 or output data 414 for the instruction 400, embedded in the instruction stream (e.g., as an immediate operand or stored in a location explicitly or implicitly referred to by an instruction), included in a table in memory, or aggregated from a plurality of these sources and/or other sources (e.g., a portion of the context information may be obtained from the pointer and another portion may be obtained from an immediate operand of the instruction 400 or a value in a register or other memory location). Any suitable context information may be used as a tweak, such as various types of metadata, a cryptographic context identifier, portions of a plaintext memory address of input data or output data, or any suitable combination thereof.

In some embodiments, context information 410 may include a tag value. For example, a tag may comprise a series of randomized bits (e.g., generated for inclusion in or association with the pointer to the input or output data). In a particular embodiment, the tag may be a randomized value returned by a memory allocation operation (e.g., malloc).

In various embodiments, context information 410 may include type information of an object represented by the data to be encrypted or decrypted. For example, the type information may include a class of data or code defined by a programming language. For example, the type information could include a type ID of "0" for an integer, a type ID of "1" for a floating point value, a type ID of "2" for a particular complex struct type, and so on. In some situations, there may be more types than can be encoded into unique type IDs, but collisions in the type ID space do not necessarily prevent correct functioning. Collisions may result in false negatives that permit a data element to be accessed as the incorrect type, so supporting as large a type ID space as possible is desirable. In some embodiments, the compiler that generates the code may insert the expected type ID into the instruction 400 as an immediate operand (or could generate an instruction that loads the type ID into a register). If the type ID used as a tweak to encrypt data does not match the type ID specified by the decryption instruction, the decryption operation will not produce the correct plaintext.

In some embodiments, the context information 410 may include size metadata, such as a memory allocation size (e.g., bytes of allocated memory referenced by an indirect address). In various embodiments, the context information 410 may include at least a portion of an address (e.g., a linear address of the block of memory being processed) in a pointer to the input or output data.

In various embodiments, the context information may include a cryptographic context ID. A cryptographic context is a particular memory space which may be authorized for a single tenant of a processor 102 (e.g., it may be a private memory space), a set of two or more tenants, or all of the tenants, where a tenant may be defined as a collection of code executed by the processor 102 (e.g., a function, a group of functions, a process, a virtual machine, or other collection of program code). A particular tenant of the processor 102 may be authorized to access any number of memory spaces, and each separate memory space may be identified by a cryptographic context ID. Accordingly, a particular tenant may be associated with one or more cryptographic context IDs, such as a private cryptographic context ID for a memory space that is only authorized for that tenant, a broadcast cryptographic context ID for a memory space that is authorized for all tenants, a unicast cryptographic context ID for a memory space that may be read from but not written to by the tenant (e.g., another tenant may populate the memory space and the tenant may consume data from that space), and/or a multicast cryptographic context ID for a memory space that may be read from and written to by multiple tenants. In some embodiments, a particular tenant may be associated with multiple cryptographic context IDs for any of these types of cryptographic context IDs.

In a particular embodiment, a cryptographic context ID may be generated by, e.g., a trusted runtime, which may generate cryptographic context IDs for multiple (or all) of the tenants of the processor 102. The trusted runtime may comprise software that is trusted by the tenants, but does not necessarily have to be privileged software. The trusted runtime is responsible for loading tenants into memory and for configuring the processor memory access control features to grant each tenant access to precisely the memory that it is authorized to access. It may also provide services such as allocating or deallocating regions of private or shared memory for tenants, sending messages between tenants, and terminating tenants.

In some embodiments, the cryptographic context IDs are random numbers (e.g., random 64-bit values). Use of the cryptographic context IDs as tweaks for encryption and decryption instructions may prevent a tenant from obtaining access to data outside of the authorized scope of data for that tenant.

A cryptographic context ID may identify, for a memory location being accessed, the scope of access of that memory location for the current tenant. If two tenants share a particular memory space, they may each be associated with the same cryptographic context ID for that space. While data sharing could also be accomplished by having tenants share cryptographic keys, use of the cryptographic context IDs may be a more efficient way to share data (e.g., the overhead with switching keys may be burdensome, especially when subkeys have to be generated).

Figure 5:
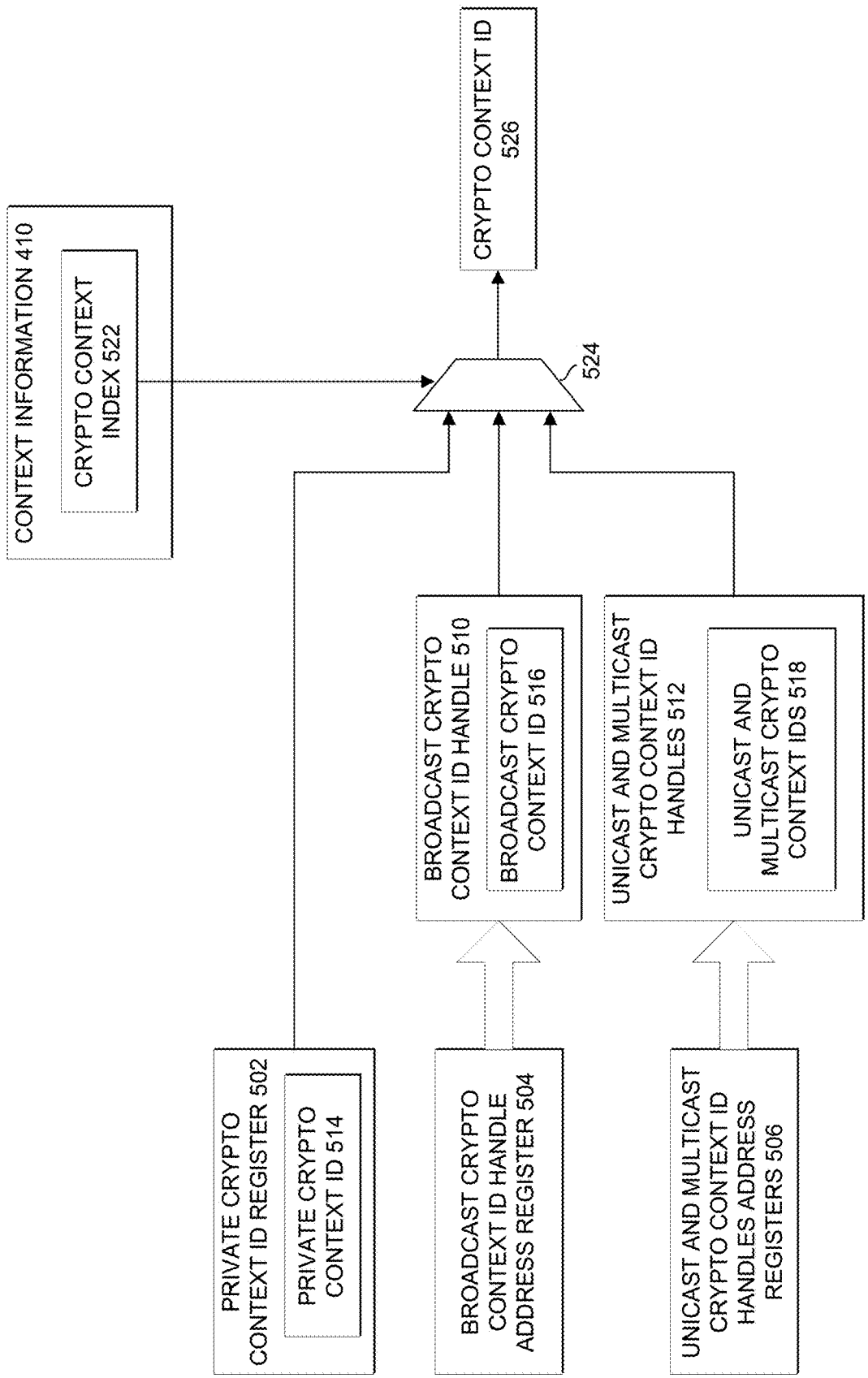
FIG. 5 illustrates selection of a cryptographic context ID in accordance with certain embodiments.

FIG. 5 illustrates selection of a cryptographic context ID 526 in accordance with certain embodiments. In this embodiment, a plurality of registers may store cryptographic context IDs or pointers (e.g., handle addresses) to handles comprising cryptographic context IDs that have been encrypted (e.g., using the wrapping key 208). For example, private cryptographic context ID register 502 may store private cryptographic context ID 514, broadcast cryptographic context ID handle address register 504 may store a pointer to broadcast cryptographic context ID handle 510, and unicast and multicast cryptographic context ID handles address registers 506 may store various pointers to unicast or multicast cryptographic context ID handles 512 (or other custom cryptographic context ID handles). Handles 510 and 512 may include encrypted cryptographic context IDs 516 and 518 defining different scopes. In various embodiments, the cryptographic context IDs 516, and 518 may be encrypted using the wrapping key 208.

Context information 410 may include a cryptographic context index 522. The cryptographic context index 522 may be supplied to the processor 102 in any suitable manner (e.g., using any of the manners described above for provision of context information 410). In some embodiments, the cryptographic context index 522 may be supplied in an input register or may be loaded from an in-memory table (or may otherwise be associated with a data pointer specified by an encrypt or decrypt instruction such as cryptographic instruction 400). The cryptographic context index 522 is used by multiplexer 524 to select from among the various available cryptographic context IDs 514, 516, and 518. For example, the cryptographic context index 522 may be used to select one of the registers 502, 504, or 506 and then the memory location stored in the selected register is accessed to obtain the appropriate handle 510 or 512 (or ID 514). If register 504 or one of registers 506 is accessed, the encrypted portion of the corresponding handle is then decrypted (e.g., by using the wrapping key 208 in a manner similar to that described above in connection with a handle 204 that includes an encrypted cryptographic key 206). The result is the cryptographic context ID 526 which may be used as all or a portion of a tweak for the cryptographic instruction 400 associated with the context information 410 including the cryptographic context index 522.

As described above, the various cryptographic context IDs (e.g., 514, 516, 518) may be generated by a trusted runtime or other trusted entity. The same entity may also call instructions to wrap the cryptographic context IDs using the wrapping key 208 (e.g., using an encryption instruction, such as one of those described herein or other suitable instruction). After the cryptographic context IDs have been wrapped, the handles may be distributed to the various tenants (e.g., each tenant may receive pointers to the handles that are relevant to that tenant). When execution at the processor 102 switches to a particular tenant, that tenant may call instructions to load the registers 502, 504, and 506 with pointers to handles associated with that tenant. When execution at the processor 102 switches to a different tenant, the new tenant may call instructions to overwrite the values of the registers 504 and 506 with the handle pointers that are associated with that new tenant.

In one embodiment, handles 510 and 512 may be encrypted using the crypto context ID specified in register 502 as a key (or tweak) (in addition or as an alternative to using the wrapping key 208). In some embodiments, register 502 may be overwritten by a value (e.g., a new private crypto context ID 514) stored in the encrypted data 304 of handle 204 when a switch to the callee tenant represented by the handle 204 is performed so that the caller tenant can switch directly to the callee tenant without first invoking the trusted runtime to reduce switching overhead.

In some embodiments, encrypted data 304 contains a code encryption key in addition to the encrypted key 206 that may be used to encrypt data. The code encryption key may be used to decrypt encrypted instructions fetched by the processor 102. In various embodiments, when a switch to a new tenant is made, registers 502, 504, and 506 may be initialized with either cryptographic context IDs or pointers to cryptographic context ID handles.

In one embodiment, the processor 102 may execute an instruction to switch tenants. The instruction may accept a pointer to such a handle as an operand and may update the various registers corresponding to the wrapped fields in the handle, as well as set the instruction pointer of the processor 102 to the authorized entrypoint 312.

In some embodiments, a new ENCODEKEY instruction variant may be defined that accepts operands for all of the wrapped fields in the handle (e.g., crypto context IDs and/or pointers to crypto context IDs).

Returning again to examples of context information 410, in yet other embodiments, the context information 410 may include a pointer authentication code. A pointer authentication code may be produced by generating a MAC over certain bits of a pointer and then inserting the MAC into upper address bits of the pointer. MACs over pointer address bits may be stored in pointers while those pointers are in memory and then removed from the pointers prior to those pointers being used in a memory operand. In some embodiments, the MACs in pointers may be retained even after they are checked so that they can be incorporated as tweaks.

In one embodiment, the combination of context information 410 that is used as a tweak may be specified using a processor 102 mode (e.g., one mode may utilize a tag, another mode may utilize a size and linear address of the block of memory being processed, another mode may utilize upper address bits, a size, a type, access rights, and a cryptographic context ID, and so on). In another embodiment, a value included in a parameter of the instruction may specify which information is to be used as a tweak. This may allow configuration of the context to be used without a mode switch and may permit multiple encodings/security policies to be used in the same application. In various embodiments, the application calling an encryption or decryption instruction writes (e.g., at compile time) at least a portion of the context information into the instruction 400 as an immediate value (or into a register that is then used by the instruction 400), and thus has a large amount of flexibility to customize the information used in the tweak.

In various embodiments, additional security may be provided via compiler static analysis and/or dynamic tracking of sensitivity of data. Compiler static analysis can be used to determine program locations (e.g., code statements) that may manipulate sensitive data. Dynamic tracking may involve embedding a pointer bit to indicate data sensitivity. The dynamic tracking may be simpler, but the static approach more precisely limits the code that is ever authorized to access sensitive data. In other words, in the dynamic approach, there may be a chance that a sensitive pointer could be forwarded to code that should not access sensitive data, whereas when static analysis is used the compiler may determine a priori that that code should not be accessing sensitive data and may statically block an instruction generated from that code from ever accessing sensitive data. Combination of the static analysis and the dynamic tracking may provide additional security benefits over either approach used alone. In such embodiments, in order to decrypt sensitive data, an instruction may be required to be included in a set of instructions authorized to access sensitive data and the pointer would need to have a set bit (or some other indication) indicating that it points to sensitive data.

Figure 6:
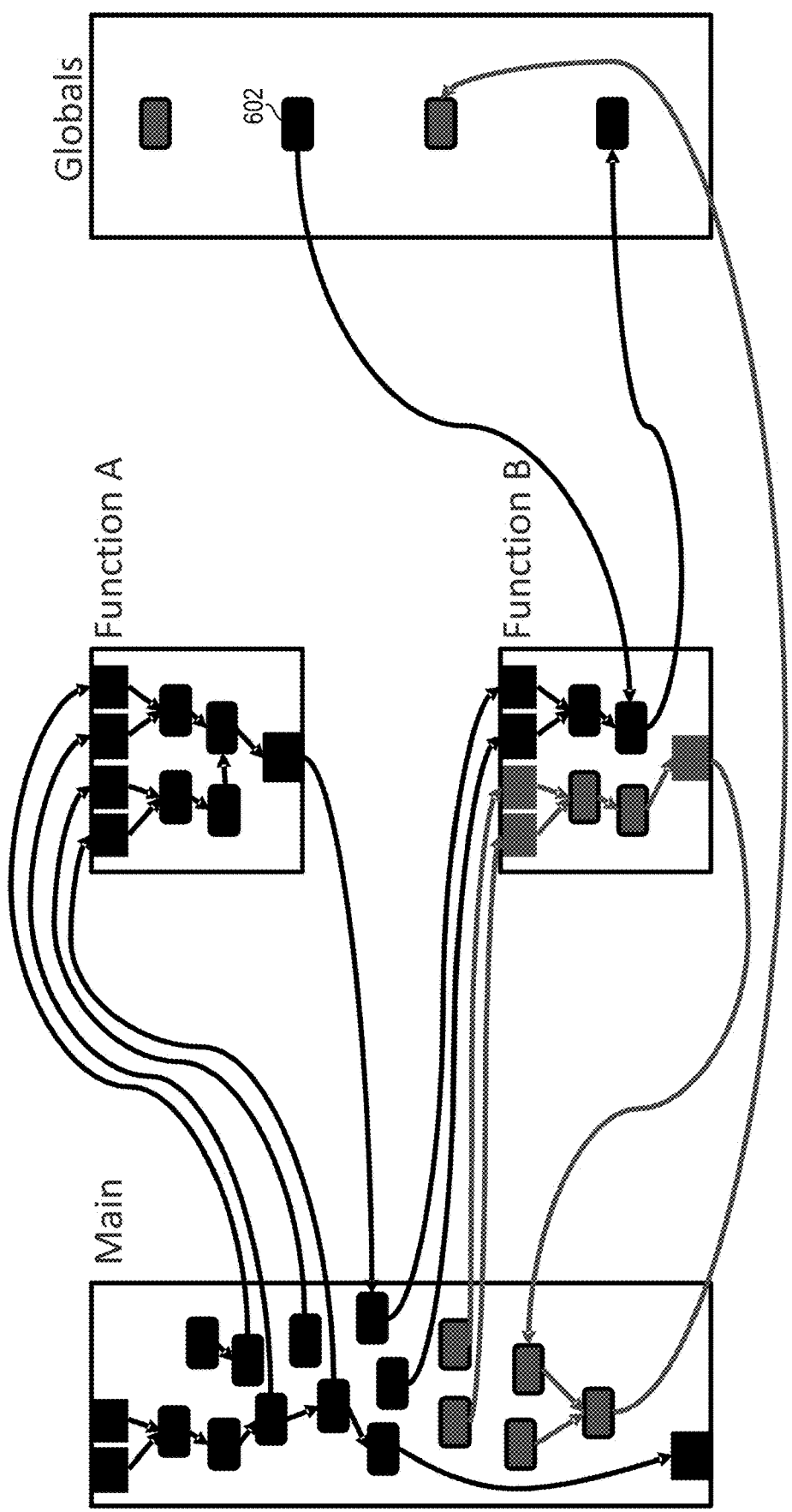
FIG. 6 illustrates a flow for compiler static analysis in accordance with certain embodiments.

FIG. 6 illustrates a flow for compiler static analysis in accordance with certain embodiments. In the embodiment depicted, a main function, a function A, and a function B of an application are shown, with squares at the top and bottom of each function respectively representing input and output parameters. The other blocks of the functions in FIG. 6 depict program statements that may be executed by the functions.

A developer may define a set of one or more variables 602 as being sensitive. This may be accomplished in any suitable manner depending on the particular program language being used. For example, in the C programming language, the variable may be annotated with an attribute indicating that it includes sensitive data. The compiler then statically analyzes where this data can flow within the program and marks statements that should be authorized to access sensitive data. For example, the compiler may mark statements that access that variable (e.g., by name). In various embodiments, the compiler may mark derivative results as sensitive as well (e.g., the result of statements to which the sensitive variable is an input). In some embodiments, the compiler may mark any program statements that access this variable. The compiler may also mark downstream program statements that access a derivative of the variable and/or upstream program statements that modify variables upon which the sensitive variable is based.

The blocks that are marked as black represent program statements or parameters that may affect or be based on the sensitive variable 602. Accordingly, such program statements may be added to a list of statements that are authorized to access sensitive data. When the compiler generates instructions based on the program statements, only data access instructions that are generated based on the program statements in the list of authorized program statements are allowed to utilize the key handle used to encrypt and decrypt the sensitive variable(s). For example, All of the boxed statements shown in black need to be able to use decryption instructions to access sensitive data. Accordingly, all data processing by these statements should be protected via encryption using a key handle 204 as described above if such data is written to memory. Instructions generated by the compiler for statements authorized to access sensitive data may take the form of, e.g., a decryption instruction utilizing a key handle 204 with an encrypted key 206 as described above or an implicit memory access (e.g., an instruction containing a memory operand that is preceded by a prefix defined to indicate that the instruction is authorized to access sensitive memory, e.g. ES MOV RAX, [RCX], if ES is a prefix defined in such a manner).

If instructions generated based on the other program statements that haven't been marked as authorized attempt to access the sensitive variable (e.g., if they try to read from the memory where the sensitive data is stored), they will encounter encrypted data and will not be allowed to decrypt the data (because decryption instructions will not be generated for such statements at compile time).

In various embodiments, a function may have multiple instances in the code of an application, some of which may be used to access sensitive data and some of which do not access sensitive data. Accordingly, the compiler may generate multiple copies of the function with different settings according to which input parameters are sensitive, such that instructions based on code of the function that does not need to access sensitive data does not use a handle to encrypt and decrypt data written to memory (and thus does not generate encryption and decryption instructions referencing such a handle).

In some cases, it is desirable for an instruction to be able to access data in memory regardless of whether it is sensitive data or non-sensitive data (e.g., some of the instructions generated based on the program statements shown in black in FIG. 6 may also operate on non-sensitive data in other parts of the application). In one embodiment, a pointer to data in memory may include a bit or other representation that indicates whether the data is encrypted using a key handle 204 or not. When the pointer is used in an instruction, the processor may examine the value of the bit. If the bit is set, then the decryption instruction that references (either explicitly or implicitly) a handle will decrypt the data using an encrypted key within the handle (e.g., as described in connection with FIG. 4). If the bit is not set, the processor 102 will treat the decryption instruction that references the handle as a normal memory load instruction and will move the data into a register without performing decryption on the data referenced by the instruction. The instructions following the decryption instruction will work in either case since they were written under the expectation that they would be operating on decrypted data.

The pointer value would indicate to the processor 102 whether the data is encrypted or unencrypted and may be set at runtime by the processor 102 (e.g., when the memory associated with the pointer is allocated). This may allow the compiler to avoid multiple copies of functions that operate on both encrypted data and decrypted data. As one example, a first type of memory allocation call (e.g., malloc or a variant thereof) may return a pointer with the bit set (indicating allocation for encrypted memory), while a second type of memory allocation call (e.g., malloc or a variant thereof) may return a pointer with the bit unset (so the processor 102 may treat this as unencrypted memory). In some embodiments, a similar process may be followed for stack allocations that are not generated by allocation libraries. In this case, a compiler may generate code indicating that stack allocation needs to be encrypted and the pointer bit is set when a pointer to stack allocation is generated but is unset for other allocations. Such approaches of embedding a pointer bit to indicate data sensitivity may simplify operation and add precision by performing dynamic tracking of sensitivity.

Thus, in some embodiments, static compiler analysis may be used to determine the maximal set of instructions that may access protected data and then the dynamic analysis may provide fine grained access control for the instructions within the maximal set of instructions.

In various embodiments, execution of a decryption instruction (e.g., a decryption instruction utilizing a key handle 204 including an encrypted key 206 or other suitable decryption instructions) may be predicated on speculative execution restrictions being activated to further protect against malicious actors. In some execution situations, a bounds check may be bypassed, leaving the system vulnerable. For example, speculative execution may occur, and software may implement a bounds check to enforce memory safety (e.g., to prevent out of bounds access). Sometimes speculative execution can proceed past the bounds check and read in out of bounds information, potentially affecting the state of the cache. The processor 102 could then use the value read as an index into an array to pull in a cache line. Later an adversary could detect that that cache line was pulled in and determine that that value was read from the out of bounds area. Assuming the adversary is the software where the bounds check is being applied, the adversary has now gained access to unauthorized data. Various embodiments described herein will limit speculative execution's effects on caches and other structures to block information disclosure by conditioning the execution of a decryption instruction on speculative restrictions being activated.

In a particular embodiment, all decryption instructions or a subset of the decryption instructions are prevented from executing unless speculative execution restrictions are active, such that decrypted data is protected by speculative execution restrictions.

In a particular embodiment, this policy may be applied to all decryption instructions that reference a handle with a wrapped cryptographic key. In another embodiment, a decryption instruction variant (e.g., having an opcode or a parameter that is different from a decryption instruction that executes regardless of whether speculative execution restrictions are active) may be used to indicate that the decryption instruction should not be executed unless speculative execution restrictions are active. In one embodiment, a defined bit in a pointer (or other information included in context information 410) may indicate that speculative execution restrictions must be active for decryption and that bit may be used as part of a tweak for the pointer encryption (e.g., when a portion of the address is encrypted) or the data encryption. In one example, when the compiler encounters an access to sensitive data, the compiler may insert the decryption instruction variant to keep the data protected once it is in the clear. Alternatively, as alluded to above, certain key handles may include AAD indicating that they are only usable for decryption when speculative execution restrictions are active. In another embodiment, a register containing a key may be marked in this manner. In various embodiments, the encryption instructions are agnostic as to whether speculative execution restrictions are active since the encrypted data would still be protected when stored.

Figure 7:
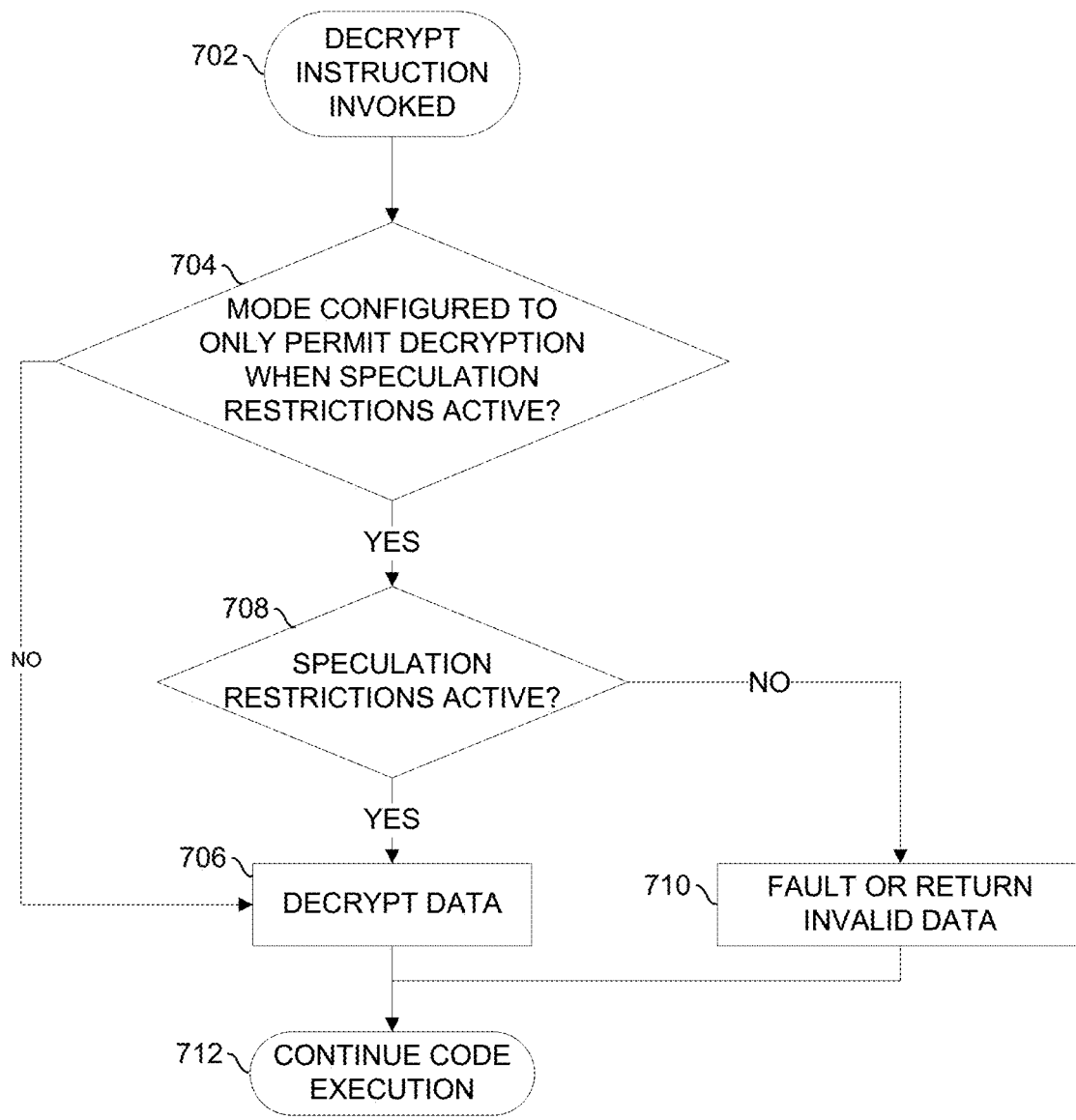
FIG. 7 illustrates a flow of a decryption instruction in accordance with certain embodiments.

FIG. 7 illustrates a flow of a decryption instruction in accordance with certain embodiments. At 702, a decryption instruction (e.g., similar to instruction 400) is invoked. In one example, the decryption instruction may refer to a handle with a wrapped cryptographic key that is to be unwrapped using a processor-internal wrapping key prior to being used in a decryption operation.

At 704, a determination is made as to whether a mode of the processor 102 is configured to only permit decryption when speculative execution restrictions are active is made. If such a mode is not configured, then the data is decrypted at 706 and code execution continues at 712. If such a mode is not configured, a determination is made at 708 as to whether speculative execution restrictions are active. This determination may be made in any suitable manner. For example, the processor 102 may store an indication of whether speculative execution restrictions are active and this indication may be checked. In various embodiments, the indication may represent whether all speculative execution is disabled or whether a subset of speculative execution operations are disabled (e.g., only speculative execution operations that present a danger to the unencrypted data). Thus, in at least one embodiment, speculative execution restrictions do not necessarily completely disable speculative execution, but may just restrict certain speculative operations.

If speculative execution restrictions are active, then the data is decrypted at 706 and code execution continues at 712. If speculative execution restrictions are not active, the processor 102 may generate a fault or may return invalid data (e.g., all zeros) at 710. Code execution may then continue at 712 (e.g., if the fault is resolved).

In various alternatives, any other type of check may be made at 704 to determine whether decryption is only permitted when speculation restrictions are active. For example, one or more bits of the pointer to the input data or output data may be examined. As another example, the type of decryption instruction may be determined (where some decryptions instructions permit execution when speculative execution restrictions are not active and other decryption instructions do not).

Despite usage of the encryption protections described herein, in some situations, a plaintext secret may be in danger of being exposed in memory. For example, if a secret was originally encrypted in memory, was subsequently decrypted and pulled into a register, and a compiler ran out of register space, the secret may be spilled onto the stack. To protect against such situations, data may be implicitly protected as it is pushed onto the stack (e.g., the processor 102 may encrypt the data sua sponte without being requested to do so via an instruction from an executing application). Stack data is a per-thread structure and is implicitly locked to stack location without compatibility problems. Accordingly, a stack encryption key may be associated with each thread (or handle or register). In one example, each software thread is assigned a unique stack encryption key managed as a handle (e.g., similar to handle 204).

In some embodiments, an instruction is introduced to load a processor-internal register with the stack encryption key for a particular thread or the stack encryption key may otherwise be accessed by the processor 102. Alternatively, the thread may be assigned a particular cryptographic context ID. For each stack access detected by the processor 102 (e.g., each stack access with an effective segment of stack segment (SS)) while speculative execution restrictions are active, the processor 102 may implicitly use the stack encryption key (or cryptographic context ID) to encrypt data to avoid the data being revealed to adversaries. In various embodiments, the data may be encrypted in this manner prior to being stored in other microarchitectural data structures (e.g., store buffers, fill buffers, load ports, caches, or dynamic random access memory (DRAM)) as it is being processed. As just one example, such processing could include an OpenSSL Rivest-Shamir-Adleman (RSA) routine if the secret data is an RSA private key.

In one embodiment, the stack encryption key is not usable when speculative execution is unrestricted, since code running without speculative execution restrictions may be able to decrypt secrets from the stack. In various embodiments, the encryption of stack data is also tweaked with the location of the data to help limit data reordering. In at least some embodiments, stack accesses are aligned to match the block size of the underlying cipher, such as a lightweight cipher with a 64-bit block size.

Figure 8:
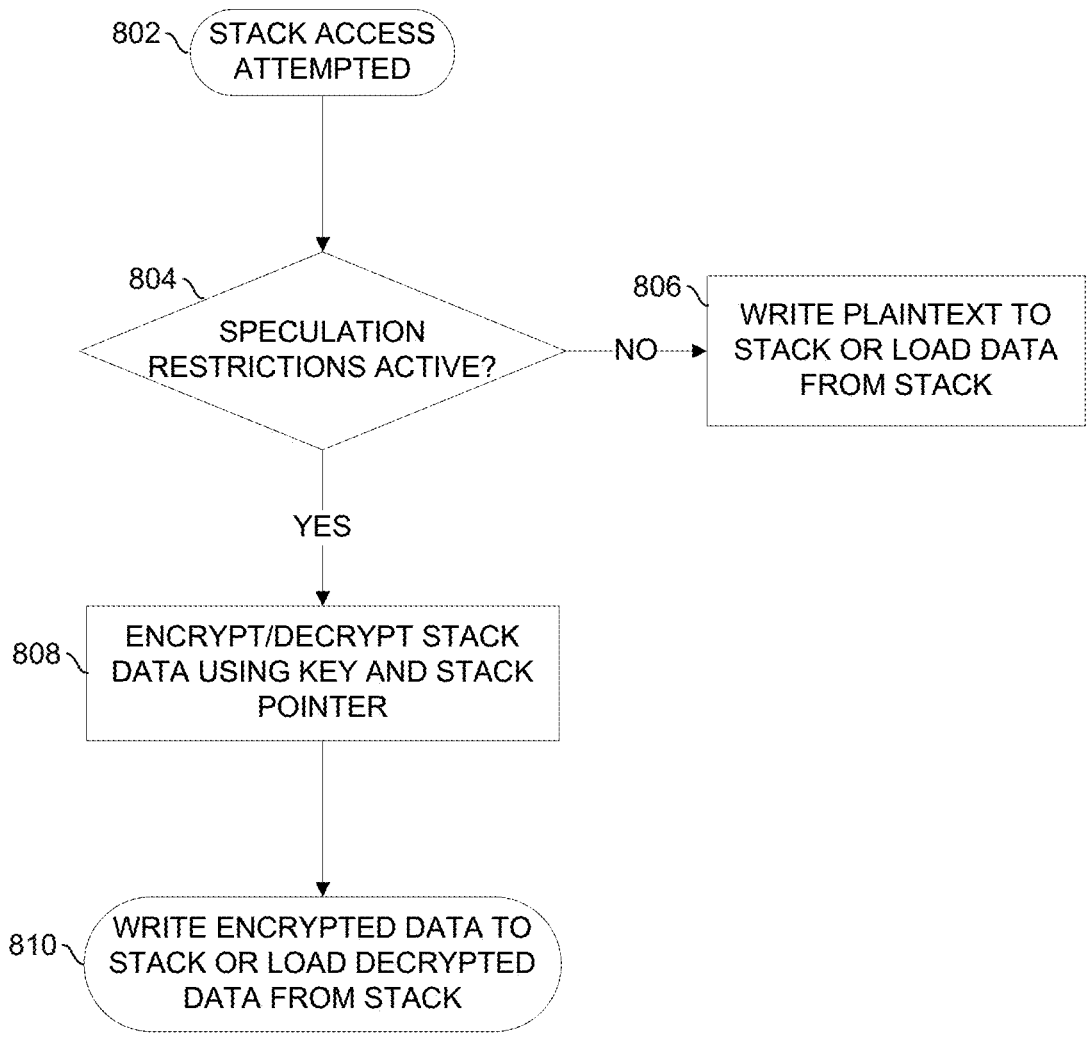
FIG. 8 illustrates a flow of a stack access in accordance with certain embodiments.

FIG. 8 illustrates a flow of a stack access in accordance with certain embodiments. At 802, a stack access is attempted. In various embodiments, the processor 102 may detect a stack access based on an effective segment. An effective segment may identify a region of multiple types of memory regions (e.g., a code region, default data region, stack data region, or other data region). A processor 102 may ascertain which region is involved based on the instruction type (e.g., a push or pop involves the stack segment). However, some instructions could refer to any of multiple regions. For such instructions, a compiler may supply this information via an instruction prefix. Some of these prefixes may communicate which segment is being accessed, thus the processor 102 can ascertain that the stack is being accessed if the instruction includes a stack segment prefix. Some other instructions may specify a memory operand using a stack pointer as a base address, and thus the processor 102 may ascertain such as a stack access.

At 804, a determination is made as to whether speculative execution restrictions are active. If they are not, plaintext is written to the stack or loaded from the stack at 806 (depending on the nature of the access). If speculative execution restrictions are active, stack data is encrypted (if the stack is being written to) or decrypted (if the stack is being read from) at 808 using the stack encryption key and the pointer to the data. At 810, the encrypted data is written to the stack or the decrypted data is loaded from the stack.

The flows described in FIGS. 4-8 are merely representative of operations or communications that may occur in particular embodiments. In other embodiments, additional operations or communications may be performed in the flows. Various embodiments of the present disclosure contemplate any suitable signaling mechanisms for accomplishing the functions described herein. Some of the operations illustrated in FIGS. 4-8 may be repeated, combined, modified, or deleted where appropriate. Additionally, operations may be performed in any suitable order without departing from the scope of particular embodiments.

Figure 9:
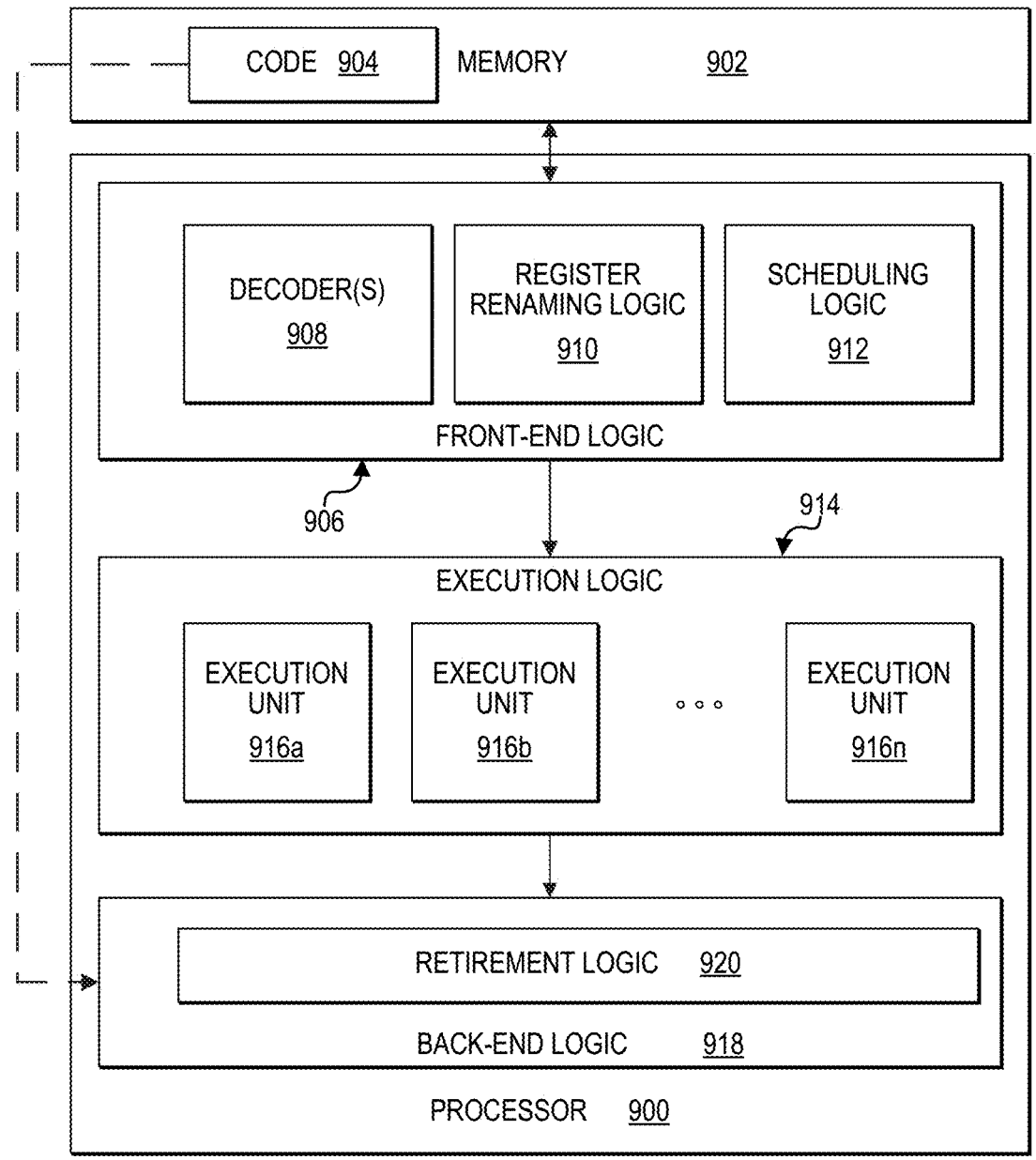
FIG. 9 is a block diagram illustrating an example processor core and memory according to at least one embodiment.
Figures 10A, 10B:
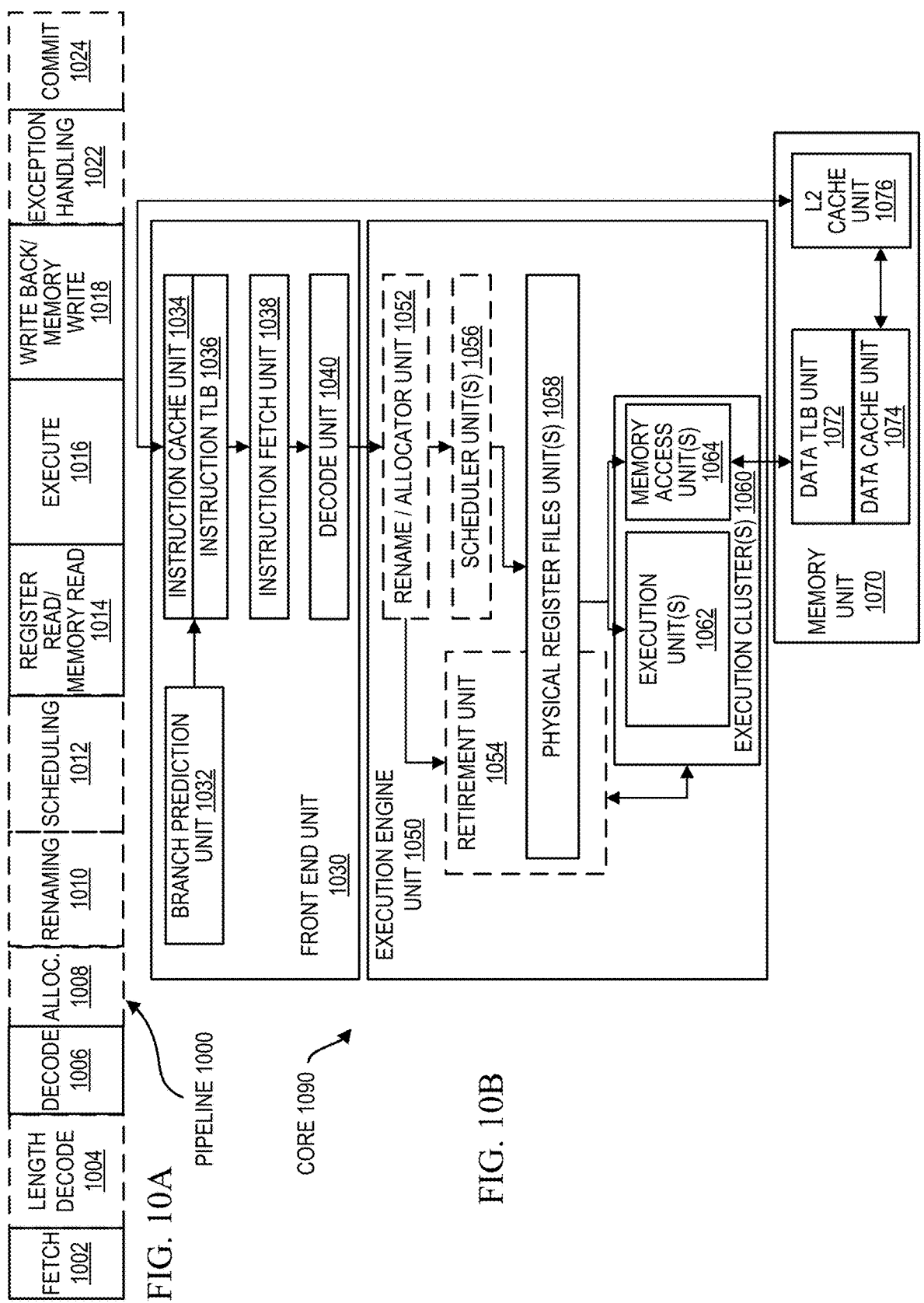
FIG. 10A is a block diagram illustrating both an exemplary in-order pipeline and an exemplary register renaming, out-of-order issue/execution pipeline in accordance with certain embodiments.
FIG. 10B is a block diagram illustrating both an exemplary embodiment of an in-order architecture core and an exemplary register renaming, out-of-order issue/execution architecture core to be included in a processor in accordance with certain embodiments.
Figure 11:
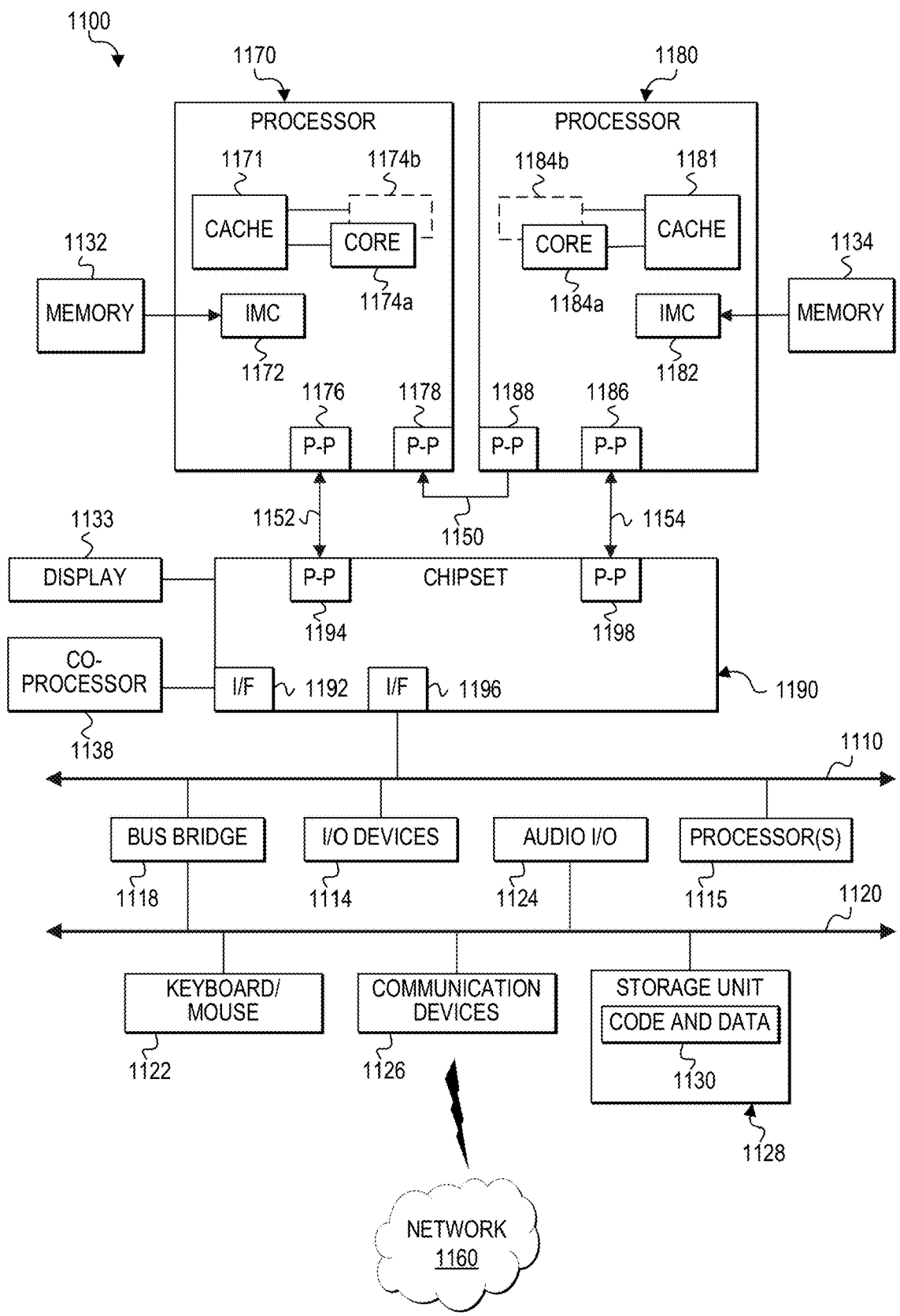
FIG. 11 is a block diagram of an example computer architecture according to at least one embodiment.

FIGS. 9-11 are block diagrams of exemplary computer architectures that may be used in accordance with any of the embodiments disclosed herein. Generally, any computer architecture designs known in the art for processors and computing systems may be used. In an example, system designs and configurations known in the arts for laptops, desktops, handheld PCs, personal digital assistants, tablets, engineering workstations, servers, network devices, servers, appliances, network hubs, routers, switches, embedded processors, digital signal processors (DSPs), graphics devices, video game devices, set-top boxes, micro controllers, smart phones, mobile devices, wearable electronic devices, portable media players, hand held devices, and various other electronic devices, are also suitable for embodiments of computing systems described herein. Generally, suitable computer architectures for embodiments disclosed herein can include, but are not limited to, configurations illustrated in FIGS. 9-11.

FIG. 9 is an example illustration of a processor according to an embodiment. Processor 900 is an example of a type of hardware device that can be used in connection with the implementations shown and described herein (e.g., processor 102). Processor 900 may be any type of processor, such as a microprocessor, an embedded processor, a digital signal processor (DSP), a network processor, a multi-core processor, a single core processor, or other device to execute code. Although only one processor 900 is illustrated in FIG. 9, a processing element may alternatively include more than one of processor 900 illustrated in FIG. 9. Processor 900 may be a single-threaded core or, for at least one embodiment, the processor 900 may be multi-threaded in that it may include more than one hardware thread context (or "logical processor") per core.

FIG. 9 also illustrates a memory 902 coupled to processor 900 in accordance with an embodiment. Memory 902 is an example of a type of hardware device that can be used in connection with the implementations shown and described herein (e.g., memory 122). Memory 902 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 900 can execute any type of instructions associated with algorithms, processes, or operations detailed herein. Generally, processor 900 can transform an element or an article (e.g., data) from one state or thing to another state or thing.

Code 904, which may be one or more instructions to be executed by processor 900, may be stored in memory 902, or may be stored in software, hardware, firmware, or any suitable combination thereof, or in any other internal or external component, device, element, or object where appropriate and based on particular needs. In one example, processor 900 can follow a program sequence of instructions indicated by code 904. Each instruction enters a front-end logic 906 and is processed by one or more decoders 908. The decoder may generate, as its output, a micro operation such as a fixed width micro operation in a predefined format, or may generate other instructions, microinstructions, or control signals that reflect the original code instruction. Front-end logic 906 also includes register renaming logic 910 and scheduling logic 912, which generally allocate resources and queue the operation corresponding to the instruction for execution.

Processor 900 can also include execution logic 914 having a set of execution units 916a, 916b, 916n, etc. Some embodiments may include a number of execution units dedicated to specific functions or sets of functions. Other embodiments may include only one execution unit or one execution unit that can perform a particular function. Execution logic 914 performs the operations specified by code instructions.

After completion of execution of the operations specified by the code instructions, back-end logic 918 can retire the instructions of code 904. In one embodiment, processor 900 allows out of order execution but requires in order retirement of instructions. Retirement logic 920 may take a variety of known forms (e.g., re-order buffers or the like). In this manner, processor 900 is transformed during execution of code 904, at least in terms of the output generated by the decoder, hardware registers and tables utilized by register renaming logic 910, and any registers (not shown) modified by execution logic 914.

Although not shown in FIG. 9, a processing element may include other elements on a chip with processor 900. For example, a processing element may include memory control logic along with processor 900. The processing element may include I/O control logic and/or may include I/O control logic integrated with memory control logic. The processing element may also include one or more caches. In some embodiments, non-volatile memory (such as flash memory or fuses) may also be included on the chip with processor 900.

FIG. 10A is a block diagram illustrating both an exemplary in-order pipeline and an exemplary register renaming, out-of-order issue/execution pipeline according to one or more embodiments of this disclosure. FIG. 10B is a block diagram illustrating both an exemplary embodiment of an in-order architecture core and an exemplary register renaming, out-of-order issue/execution architecture core to be included in a processor according to one or more embodiments of this disclosure. The solid lined boxes in FIG. 10A-10B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a schedule (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front end unit 1030 coupled to an execution engine unit 1050, and both are coupled to a memory unit 1070. Processor core 1090 and memory unit 1070 are examples of the types of hardware that can be used in connection with the implementations shown and described herein (e.g., processor 102, memory 122). The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like. In addition, processor core 1090 and its components represent example architecture that could be used to implement logical processors and their respective components.

The front end unit 1030 includes a branch prediction unit 1032 coupled to an instruction cache unit 1034, which is coupled to an instruction translation lookaside buffer (TLB) unit 1036, which is coupled to an instruction fetch unit 1038, which is coupled to a decode unit 1040. The decode unit 1040 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM or other medium that stores microcode for certain macroinstructions (e.g., in decode unit 1040 or otherwise within the front end unit 1030). The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1058 comprises a vector registers unit, a write mask registers unit, and a scalar registers unit. These register units may provide architectural vector registers, vector mask registers, and general purpose registers (GPRs). In at least some embodiments described herein, register units 1058 are examples of the types of hardware that can be used in connection with the implementations shown and described herein (e.g., registers 112). The physical register file(s) unit(s) 1058 is overlapped by the retirement unit 1054 to illustrate various ways in which register renaming and out-of-order execution may be implemented (e.g., using a reorder buffer(s) and a retirement register file(s); using a future file(s), a history buffer(s), and a retirement register file(s); using register maps and a pool of registers; etc.). The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Execution units 1062 may also include an address generation unit (e.g., 822) to calculate addresses used by the core to access main memory (e.g., memory unit 1070) and a page miss handler (PMH) (e.g., 826).

The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one exemplary embodiment, the memory access units 1064 may include a load unit, a store address unit, and a store data unit, each of which is coupled to the data TLB unit 1072 in the memory unit 1070. The instruction cache unit 1034 is further coupled to a level 2 (L2) cache unit 1076 in the memory unit 1070. The L2 cache unit 1076 is coupled to one or more other levels of cache and eventually to a main memory. In addition, a page miss handler (e.g., page miss handler 826) may also be included in core 1090 to look up an address mapping in a page table if no match is found in the data TLB unit 1072.

By way of example, the exemplary register renaming, out-of-order issue/execution core architecture may implement the pipeline 1000 as follows: 1) the instruction fetch 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the schedule stage 1012; 5) the physical register file(s) unit(s) 1058 and the memory unit 1070 perform the register read/memory read stage 1014; the execution cluster 1060 perform the execute stage 1016; 6) the memory unit 1070 and the physical register file(s) unit(s) 1058 perform the write back/memory write stage 1018; 7) various units may be involved in the exception handling stage 1022; and 8) the retirement unit 1054 and the physical register file(s) unit(s) 1058 perform the commit stage 1024.

The core 1090 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1090 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology). Accordingly, in at least some embodiments, multi-threaded enclaves may be supported.

While register renaming is described in the context of out-of-order execution, it should be understood that register renaming may be used in an in-order architecture. While the illustrated embodiment of the processor also includes separate instruction and data cache units 1034/1074 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 11 illustrates a computing system 1100 that is arranged in a point-to-point (PtP) configuration according to an embodiment. In particular, FIG. 11 shows a system where processors, memory, and input/output devices are interconnected by a number of point-to-point interfaces. Generally, one or more of the computing systems or computing devices described (e.g., computing device 100) herein may be configured in the same or similar manner as computing system 1100.

Processors 1170 and 1180 may be implemented as single core processors 1174*a* and 1184*a* or multi-core processors 1174*a*-1174*b* and 1184*a*-1184*b*. Processors 1170 and 1180 may each include a cache 1171 and 1181 used by their respective core or cores. A shared cache (not shown) may be included in either processors or outside of both processors, yet connected with the processors via P-P interconnect, such that either or both processors' local cache information may be stored in the shared cache if a processor is placed into a low power mode. It should be noted that one or more embodiments described herein could be implemented in a computing system, such as computing system 1100. Moreover, processors 1170 and 1180 are examples of the types of hardware that can be used in connection with the implementations shown and described herein (e.g., processor 102).

Processors 1170 and 1180 may also each include integrated memory controller logic (MC) 1172 and 1182 to communicate with memory elements 1132 and 1134, which may be portions of main memory locally attached to the respective processors. In alternative embodiments, memory controller logic 1172 and 1182 may be discrete logic separate from processors 1170 and 1180. Memory elements 1132 and/or 1134 may store various data to be used by processors 1170 and 1180 in achieving operations and functionality outlined herein.

Processors 1170 and 1180 may be any type of processor, such as those discussed in connection with other figures. Processors 1170 and 1180 may exchange data via a point-to-point (PtP) interface 1150 using point-to-point interface circuits 1178 and 1188, respectively. Processors 1170 and 1180 may each exchange data with an input/output (I/O) subsystem 1190 via individual point-to-point interfaces 1152 and 1154 using point-to-point interface circuits 1176, 1186, 1194, and 1198. I/O subsystem 1190 may also exchange data with a high-performance graphics circuit 1138 via a high-performance graphics interface 1139, using an interface circuit 1192, which could be a PtP interface circuit. In one embodiment, the high-performance graphics circuit 1138 is a special-purpose processor, such as, for example, a high-throughput MIC processor, a network or communication processor, compression engine, graphics processor, GPGPU, embedded processor, or the like. I/O subsystem 1190 may also communicate with a display 1133 for displaying data that is viewable by a human user. In alternative embodiments, any or all of the PtP links illustrated in FIG. 11 could be implemented as a multi-drop bus rather than a PtP link.

I/O subsystem 1190 may be in communication with a bus 1120 via an interface circuit 1196. Bus 1120 may have one or more devices that communicate over it, such as a bus bridge 1118 and I/O devices 1116. Via a bus 1110, bus bridge 1118 may be in communication with other devices such as a user interface 1112 (such as a keyboard, mouse, touchscreen, or other input devices), communication devices 1126 (such as modems, network interface devices, or other types of communication devices that may communicate through a computer network 1160), audio I/O devices 1114, and/or a data storage device 1128. Data storage device 1128 may store code and data 1130, which may be executed by processors 1170 and/or 1180. In alternative embodiments, any portions of the bus architectures could be implemented with one or more PtP links.

Program code, such as code 1130, may be applied to input instructions to perform the functions described herein and generate output information. The output information may be applied to one or more output devices, in known fashion. For purposes of this application, a processing system may be part of computing system 1100 and includes any system that has a processor, such as, for example; a digital signal processor (DSP), a microcontroller, an application specific integrated circuit (ASIC), or a microprocessor.

The program code (e.g., 1130) may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the one or more of the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the present disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

The computing system depicted in FIG. 11 is a schematic illustration of an embodiment of a computing system that may be utilized to implement various embodiments discussed herein. It will be appreciated that various components of the system depicted in FIG. 11 may be combined in a system-on-a-chip (SoC) architecture or in any other suitable configuration capable of achieving the functionality and features of examples and implementations provided herein.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 12:
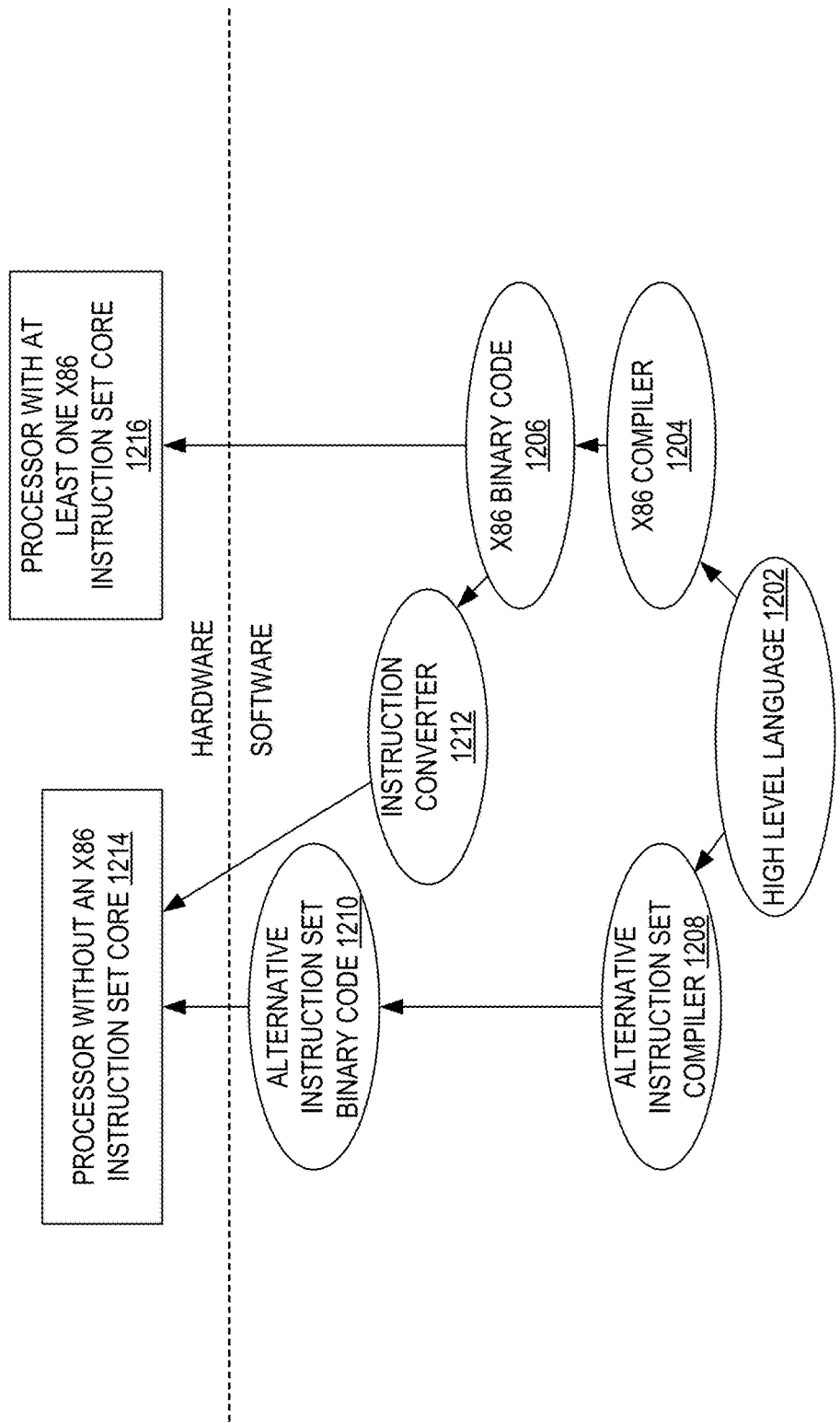
FIG. 12 is a block diagram contrasting the use of a software instruction converter to convert binary instructions in a source instruction set to binary instructions in a target instruction set according to embodiments of the present disclosure.

FIG. 12 is a block diagram contrasting the use of a software instruction converter to convert binary instructions in a source instruction set to binary instructions in a target instruction set according to embodiments of this disclosure. In the illustrated embodiment, the instruction converter is a software instruction converter, although alternatively the instruction converter may be implemented in software, firmware, hardware, or various combinations thereof. FIG. 12 shows a program in a high level language 1202 may be compiled using an x86 compiler 1204 to generate x86 binary code 1206 that may be natively executed by a processor with at least one x86 instruction set core 1216. The processor with at least one x86 instruction set core 1216 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1204 represents a compiler that is operable to generate x86 binary code 1206 (e.g., object code) that can, with or without additional linkage processing, be executed on the processor with at least one x86 instruction set core 1216. Similarly, FIG. 12 shows the program in the high level language 1202 may be compiled using an alternative instruction set compiler 1208 to generate alternative instruction set binary code 1210 that may be natively executed by a processor without at least one x86 instruction set core 1214 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1212 is used to convert the x86 binary code 1206 into code that may be natively executed by the processor without an x86 instruction set core 1214. This converted code is not likely to be the same as the alternative instruction set binary code 1210 because an instruction converter capable of this is difficult to make; however, the converted code will accomplish the general operation and be made up of instructions from the alternative instruction set. Thus, the instruction converter 1212 represents software, firmware, hardware, or a combination thereof that, through emulation, simulation or any other process, allows a processor or other electronic device that does not have an x86 instruction set processor or core to execute the x86 binary code 1206.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Other variations are within the scope of the following claims.

The architectures presented herein are provided by way of example only, and are intended to be non-exclusive and non-limiting. Furthermore, the various parts disclosed are intended to be logical divisions only, and need not necessarily represent physically separate hardware and/or software components. Certain computing systems may provide memory elements in a single physical memory device, and in other cases, memory elements may be functionally distributed across many physical devices. In the case of virtual machine managers or hypervisors, all or part of a function may be provided in the form of software or firmware running over a virtualization layer to provide the disclosed logical function.

Note that with the examples provided herein, interaction may be described in terms of a single computing system. However, this has been done for purposes of clarity and example only. In certain cases, it may be easier to describe one or more of the functionalities of a given set of flows by only referencing a single computing system. Moreover, the system for deep learning and malware detection is readily scalable and can be implemented across a large number of components (e.g., multiple computing systems), as well as more complicated/sophisticated arrangements and configurations. Accordingly, the examples provided should not limit the scope or inhibit the broad teachings of the computing system as potentially applied to a myriad of other architectures.

As used herein, unless expressly stated to the contrary, use of the phrase 'at least one of' refers to any combination of the named items, elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z.

Additionally, unless expressly stated to the contrary, the terms 'first', 'second', 'third', etc., are intended to distinguish the particular nouns (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

References in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment.

While this specification contains many specific implementation details, these should not be construed as limitations on the scope of any embodiments or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, the separation of various system components and modules in the embodiments described above should not be understood as requiring such separation in all embodiments. It should be understood that the described program components, modules, and systems can generally be integrated together in a single software product or packaged into multiple software products.

Thus, particular embodiments of the subject matter have been described. Other embodiments are within the scope of this disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Example 1 may comprise a processor comprising a first register to store a wrapping key; a second register to store a pointer to a handle stored in a memory coupled to the processor, the handle comprising a cryptographic key encrypted using the wrapping key; and a core to execute a decryption instruction, wherein the core comprises circuitry to, responsive to the decryption instruction identify, in the decryption instruction, a pointer to ciphertext stored in the memory; retrieve the ciphertext and the handle from the memory; decrypt the cryptographic key of the handle based on the wrapping key; and decrypt the ciphertext based on the decrypted cryptographic key.

Example 2 may comprise the subject matter of example 1, wherein the core is to determine whether the decryption instruction is authorized to decrypt the ciphertext prior to decrypting the ciphertext.

Example 3 may comprise the subject matter of any of examples 1-2, wherein the core is to determine whether the decryption instruction is authorized to decrypt the ciphertext based on a value of a bit included in the pointer to the ciphertext.

Example 4 may comprise the subject matter of example 3, wherein the processor is to set the bit included in the pointer to the ciphertext responsive to a memory allocation instruction.

Example 5 may comprise the subject matter of example 3, wherein the core is configured to execute a second decryption instruction, wherein the core is to, responsive to the second decryption instruction: identify, in the second decryption instruction, a pointer to data stored in the memory; determine that a bit included in the pointer to data stored in the memory is not set, wherein the bit included in the pointer to data stored in the memory has the same position as the bit included in the pointer to the ciphertext of the decryption instruction; and pass data from the memory to a third register without decrypting data responsive to the determination.

Example 6 may comprise the subject matter of any of examples 1-5, wherein the processor is configured to retrieve the pointer to the handle from the second register responsive to the decryption instruction and the decryption instruction does not include a parameter that explicitly references the second register.

Example 7 may comprise the subject matter of any of examples 1-6, wherein the core is further to determine, in response to the decryption instruction, whether speculative execution restrictions are active prior to decrypting the ciphertext based on the decrypted cryptographic key.

Example 8 may comprise the subject matter of any of examples 1-7, wherein the core is to decrypt the ciphertext further based on a tweak comprising context information associated with the decryption instruction.

Example 9 may comprise the subject matter of example 8, wherein the context information is derived from the pointer to ciphertext.

Example 10 may comprise the subject matter of example 8, wherein the context information is included in an immediate operand of the decryption instruction.

Example 11 may comprise the subject matter of example 8, wherein the context information is stored in a third register of the processor and the third register is specified in the decryption instruction.

Example 12 may comprise the subject matter of example 8, wherein the context information comprises a cryptographic context identifier defining an access scope to the pointer to ciphertext for a tenant that issued the decryption instruction.

Example 13 may comprise the subject matter of example 12, wherein the cryptographic context identifier is selected from a plurality of cryptographic context identifiers associated with the tenant, wherein the selection is based on a cryptographic context index included within the pointer to ciphertext or otherwise associated with the decryption instruction.

Example 14 may comprise the subject matter of example 12, wherein the cryptographic context identifier is decrypted using the wrapping key prior to being used in the tweak.

Example 15 may comprise the subject matter of any of examples 1-14, further comprising one or more of a battery communicatively coupled to the processor, a display communicatively coupled to the processor, or a network interface communicatively coupled to the processor.

Example 16 may comprise a method comprising: storing a wrapping key in a first register of a processor; storing, in a second register of the processor, a pointer to a handle stored in a memory coupled to the processor, the handle comprising a cryptographic key encrypted using the wrapping key; and executing, by a core of the processor, a decryption instruction, the execution comprising: identifying, in the decryption instruction, a pointer to ciphertext stored in the memory; retrieving the ciphertext and the handle from the memory; decrypting the cryptographic key of the handle based on the wrapping key; and decrypting the ciphertext based on the decrypted cryptographic key.

Example 17 may comprise the subject matter of example 16, further comprising determining whether the decryption instruction is authorized to decrypt the ciphertext prior to decrypting the ciphertext.

Example 18 may comprise the subject matter of any of examples 16-17, further comprising determining whether the decryption instruction is authorized to decrypt the ciphertext based on a value of a bit included in the pointer to the ciphertext.

Example 19 may comprise the subject matter of example 18, further comprising setting the bit included in the pointer to the ciphertext responsive to a memory allocation instruction.

Example 20 may comprise the subject matter of example 18, further comprising executing a second decryption instruction, wherein the core is to, responsive to the second decryption instruction: identifying, in the second decryption instruction, a pointer to data stored in the memory; determining that a bit included in the pointer to data stored in the memory is not set, wherein the bit included in the pointer to data stored in the memory has the same position as the bit included in the pointer to the ciphertext of the decryption instruction; and passing data from the memory to a third register without decrypting data responsive to the determination.

Example 21 may comprise the subject matter of any of examples 16-20, further comprising retrieving the pointer to the handle from the second register responsive to the decryption instruction and wherein the decryption instruction does not include a parameter that explicitly references the second register.

Example 22 may comprise the subject matter of any of examples 16-21, further comprising determining, in response to the decryption instruction, whether speculative execution restrictions are active prior to decrypting the ciphertext based on the decrypted cryptographic key.

Example 23 may comprise the subject matter of any of examples 16-22, further comprising decrypting the ciphertext further based on a tweak comprising context information associated with the decryption instruction.

Example 24 may comprise the subject matter of example 23, wherein the context information is derived from the pointer to ciphertext.

Example 25 may comprise the subject matter of example 23, wherein the context information is included in an immediate operand of the decryption instruction.

Example 26 may comprise the subject matter of example 23, wherein the context information is stored in a third register of the processor and the third register is specified in the decryption instruction.

Example 27 may comprise the subject matter of example 23, wherein the context information comprises a cryptographic context identifier defining an access scope to the pointer to ciphertext for a tenant that issued the decryption instruction.

Example 28 may comprise the subject matter of example 27, wherein the cryptographic context identifier is selected from a plurality of cryptographic context identifiers associated with the tenant, wherein the selection is based on a cryptographic context index included within the pointer to ciphertext or otherwise associated with the decryption instruction.

Example 29 may comprise the subject matter of example 27, wherein the cryptographic context identifier is decrypted using the wrapping key prior to being used in the tweak.

Example 30 may comprise the subject matter of any of examples 16-29, further comprising communicatively coupling the processor to a battery, a display, or a network interface.

Example 31 may comprise one or more non-transitory computer-readable media with code stored thereon, wherein the code is executable to cause a machine to: store a wrapping key in a first register; store, in a second register, a pointer to a handle stored in a memory, the handle comprising a cryptographic key encrypted using the wrapping key; and execute a decryption instruction, the execution comprising: identifying, in the decryption instruction, a pointer to ciphertext stored in the memory; retrieving the ciphertext and the handle from the memory; decrypting the cryptographic key of the handle based on the wrapping key; and decrypting the ciphertext based on the decrypted cryptographic key.

Example 32 may comprise the subject matter of example 31, wherein the code is executable to cause the machine to determine whether the decryption instruction is authorized to decrypt the ciphertext prior to decrypting the ciphertext.

Example 33 may comprise the subject matter of any of examples 31-32, wherein the code is executable to cause the machine to determine whether the decryption instruction is authorized to decrypt the ciphertext based on a value of a bit included in the pointer to the ciphertext.

Example 34 may comprise the subject matter of example 33, wherein the code is executable to cause the machine to set the bit included in the pointer to the ciphertext responsive to a memory allocation instruction.

Example 35 may comprise the subject matter of example 33, wherein the code is executable to cause the machine execute a second decryption instruction, wherein the code is executable to cause the machine to, responsive to the second decryption instruction: identify, in the second decryption instruction, a pointer to data stored in the memory; determine that a bit included in the pointer to data stored in the memory is not set, wherein the bit included in the pointer to data stored in the memory has the same position as the bit included in the pointer to the ciphertext of the decryption instruction; and pass data from the memory to a third register without decrypting data responsive to the determination.

Example 36 may comprise the subject matter of any of examples 31-35, wherein the code is executable to cause the machine to retrieve the pointer to the handle from the second register responsive to the decryption instruction and the decryption instruction does not include a parameter that explicitly references the second register.

Example 37 may comprise the subject matter of any of examples 31-36, wherein the code is executable to cause the machine to determine, in response to the decryption instruction, whether speculative execution restrictions are active prior to decrypting the ciphertext based on the decrypted cryptographic key.

Example 38 may comprise the subject matter of any of examples 31-37, wherein the code is executable to cause the machine to decrypt the ciphertext further based on a tweak comprising context information associated with the decryption instruction.

Example 39 may comprise the subject matter of example 38, wherein the context information is derived from the pointer to ciphertext.

Example 40 may comprise the subject matter of example 38, wherein the context information is included in an immediate operand of the decryption instruction.

Example 41 may comprise the subject matter of example 38, wherein the context information is stored in a third register of the processor and the third register is specified in the decryption instruction.

Example 42 may comprise the subject matter of example 38, wherein the context information comprises a cryptographic context identifier defining an access scope to the pointer to ciphertext for a tenant that issued the decryption instruction.

Example 43 may comprise the subject matter of example 42, wherein the cryptographic context identifier is selected from a plurality of cryptographic context identifiers associated with the tenant, wherein the selection is based on a cryptographic context index included within the pointer to ciphertext or otherwise associated with the decryption instruction.

Example 44 may comprise the subject matter of example 42, wherein the cryptographic context identifier is decrypted using the wrapping key prior to being used in the tweak.

What is claimed is:

1. A processor comprising:
   a first register to store a wrapping key;
   a second register to store a pointer to a handle stored in a memory coupled to the processor, the handle comprising a cryptographic key encrypted using the wrapping key; and
   a core to execute a decryption instruction, wherein the core comprises circuitry to, responsive to the decryption instruction:
      identify, in the decryption instruction, a pointer to ciphertext stored in the memory;
      retrieve the ciphertext and the handle from the memory;
      decrypt the cryptographic key of the handle based on the wrapping key; and
      decrypt the ciphertext based on the decrypted cryptographic key.

2. The processor of claim 1, wherein the core is to determine whether the decryption instruction is authorized to decrypt the ciphertext prior to decrypting the ciphertext.

3. The processor of claim 2, wherein the core is to determine whether the decryption instruction is authorized to decrypt the ciphertext based on a value of a bit included in the pointer to the ciphertext.

4. The processor of claim 3, wherein the processor is to set the bit included in the pointer to the ciphertext responsive to a memory allocation instruction.

5. The processor of claim 3, wherein the core is configured to execute a second decryption instruction, wherein the core is to, responsive to the second decryption instruction:
   identify, in the second decryption instruction, a pointer to data stored in the memory;
   determine that a bit included in the pointer to data stored in the memory is not set, wherein the bit included in the pointer to data stored in the memory has the same position as the bit included in the pointer to the ciphertext of the decryption instruction; and
   pass data from the memory to a third register without decrypting data responsive to the determination.

6. The processor of claim 1, wherein the processor is configured to retrieve the pointer to the handle from the second register responsive to the decryption instruction and the decryption instruction does not include a parameter that explicitly references the second register.

7. The processor of claim 1, wherein the core is further to determine, in response to the decryption instruction, whether speculative execution restrictions are active prior to decrypting the ciphertext based on the decrypted cryptographic key.

8. The processor of claim 1, wherein the core is to decrypt the ciphertext further based on a tweak comprising context information associated with the decryption instruction.

9. The processor of claim 8, wherein the context information is derived from the pointer to ciphertext.

10. The processor of claim 8, wherein the context information is included in an immediate operand of the decryption instruction.

11. The processor of claim 8, wherein the context information is stored in a third register of the processor and the third register is specified in the decryption instruction.

12. The processor of claim 8, wherein the context information comprises a cryptographic context identifier defining an access scope to the pointer to ciphertext for a tenant that issued the decryption instruction.

13. The processor of claim 12, wherein the cryptographic context identifier is selected from a plurality of cryptographic context identifiers associated with the tenant, wherein the selection is based on a cryptographic context index included within the pointer to ciphertext or otherwise associated with the decryption instruction.

14. The processor of claim 12, wherein the cryptographic context identifier is decrypted using the wrapping key prior to being used in the tweak.

15. The processor of claim 1, further comprising one or more of a battery communicatively coupled to the processor, a display communicatively coupled to the processor, or a network interface communicatively coupled to the processor.

16. A method comprising:
   storing a wrapping key in a first register of a processor;
   storing, in a second register of the processor, a pointer to a handle stored in a memory coupled to the processor, the handle comprising a cryptographic key encrypted using the wrapping key; and
   executing, by a core of the processor, a decryption instruction, the execution comprising:
      identifying, in the decryption instruction, a pointer to ciphertext stored in the memory;
      retrieving the ciphertext and the handle from the memory;
      decrypting the cryptographic key of the handle based on the wrapping key; and
      decrypting the ciphertext based on the decrypted cryptographic key.

17. The method of claim 16, further comprising, determining whether the decryption instruction is authorized to decrypt the ciphertext prior to decrypting the ciphertext.

18. The method of claim 17, further comprising determining whether the decryption instruction is authorized to decrypt the ciphertext based on a value of a bit included in the pointer to the ciphertext.

19. One or more non-transitory computer-readable media with code stored thereon, wherein the code is executable to cause a machine to:
   store a wrapping key in a first register;
   store, in a second register, a pointer to a handle stored in a memory, the handle comprising a cryptographic key encrypted using the wrapping key; and
   execute a decryption instruction, the execution comprising:
      identifying, in the decryption instruction, a pointer to ciphertext stored in the memory;
      retrieving the ciphertext and the handle from the memory;
      decrypting the cryptographic key of the handle based on the wrapping key; and
      decrypting the ciphertext based on the decrypted cryptographic key.

20. The one or more computer-readable media of claim 19, wherein the code is executable to cause the machine further to determine whether the decryption instruction is authorized to decrypt the ciphertext prior to decrypting the ciphertext.

* * * * *